United States Patent [19]
Sato et al.

[11] Patent Number: 6,065,930
[45] Date of Patent: May 23, 2000

[54] COOLING CONTROL APPARATUS

[75] Inventors: Yoich Sato; Hironobu Kageyama; Tadashi Kaneko; Takeo Tabata; Akihiro Yamazaki; Akiko Okada; Kazuhiro Yuuki, all of Kawasaki, Japan

[73] Assignee: Fujitsu Limited, Kawasaki, Japan

[21] Appl. No.: 09/025,627

[22] Filed: Feb. 18, 1998

[30] Foreign Application Priority Data

Jul. 15, 1997 [JP] Japan .................................. 9-190046

[51] Int. Cl.[7] .................................................. B63H 3/06
[52] U.S. Cl. .................. 416/39; 416/44; 416/36; 416/37; 415/1; 415/17; 415/30; 415/47
[58] Field of Search ...................... 415/1, 17, 30, 415/47, 13; 416/31, 36, 37, 39, 44, 47, 48; 454/184

[56] References Cited

FOREIGN PATENT DOCUMENTS

| | | |
|---|---|---|
| 1-188922 | 7/1989 | Japan . |
| 1-195523 | 8/1989 | Japan . |
| 3-25267 | 2/1991 | Japan . |
| 3-209533 | 9/1991 | Japan . |
| 3-244987 | 10/1991 | Japan . |
| 3-269710 | 12/1991 | Japan . |

*Primary Examiner*—Edward K. Look
*Assistant Examiner*—Ninh Nguyen
*Attorney, Agent, or Firm*—Staas & Halsey LLP

[57] ABSTRACT

A cooling control apparatus controls a plurality of cooling members. The apparatus has a monitor which monitors states of predetermined combinations of the cooling members and a controller which controls the cooling members based on the states monitored by the monitor.

13 Claims, 17 Drawing Sheets

FIG. 4

| STATE NO. | COOLING CAPABILITY POINT | | | | FAN COMBINATION POINT | | | | | | | | | | | | | REQUIRED COOLING CONDITION POINT AND DECISION | | | | | | |
|---|---|---|---|---|---|---|---|---|---|---|---|---|---|---|---|---|---|---|---|---|---|---|---|---|
| | | | | | SUM OF POINTS | | | | | | | PRODUCT OF POINTS | | | | | | | | | | | | |
| | | | | | ① | ② | ③ | ④ | ⑤ | ⑥ | ⑦ | ① | ② | ③ | ④ | ⑤ | ⑥ | | | | | | | |
| | FAN 1 | FAN 2 | FAN 3 | FAN 4 | 1+2 | 1+3 | 1+4 | 2+3 | 2+4 | 3+4 | ALL | 1x2 | 1x3 | 1x4 | 2x3 | 2x4 | 3x4 | 1 | 2 | 3 | 4 | 5 | 6 | 7 |
| 1 | 0 | 0 | 0 | 0 | 0 | 0 | 0 | 0 | 0 | 0 | 0 | 0 | 0 | 0 | 0 | 0 | 0 | × | × | × | × | × | × | × |
| 2 | 0 | 0 | 0 | 1 | 0 | 0 | 1 | 0 | 1 | 1 | 1 | 0 | 0 | 0 | 0 | 0 | 0 | ◎ | × | × | × | × | × | × |
| 3 | 0 | 0 | 0 | 2 | 0 | 0 | 2 | 0 | 2 | 2 | 2 | 0 | 0 | 0 | 0 | 0 | 0 | ◎ | ○ | × | × | × | × | × |
| 4 | 0 | 0 | 1 | 0 | 0 | 1 | 0 | 1 | 0 | 1 | 1 | 0 | 0 | 0 | 0 | 0 | 0 | ◎ | × | × | × | × | × | × |
| 5 | 0 | 0 | 1 | 1 | 0 | 1 | 1 | 1 | 1 | 2 | 2 | 0 | 0 | 0 | 0 | 0 | 1 | ◎ | ○ | × | × | × | × | × |
| 6 | 0 | 0 | 1 | 2 | 0 | 1 | 2 | 1 | 2 | 3 | 3 | 0 | 0 | 0 | 0 | 0 | 2 | ◎ | ◎ | ○ | × | × | × | × |
| 7 | 0 | 0 | 2 | 0 | 0 | 2 | 0 | 2 | 0 | 2 | 2 | 0 | 0 | 0 | 0 | 0 | 0 | ◎ | ○ | × | × | × | × | × |
| 8 | 0 | 0 | 2 | 1 | 0 | 2 | 1 | 2 | 1 | 3 | 3 | 0 | 0 | 0 | 0 | 0 | 2 | ◎ | ◎ | ○ | × | × | × | × |
| 9 | 0 | 0 | 2 | 2 | 0 | 2 | 2 | 2 | 2 | 4 | 4 | 0 | 0 | 0 | 0 | 0 | 4 | ◎ | ◎ | ◎ | ○ | × | × | × |
| 10 | 0 | 1 | 0 | 0 | 1 | 0 | 0 | 1 | 1 | 0 | 1 | 0 | 0 | 0 | 0 | 0 | 0 | ◎ | × | × | × | × | × | × |
| 11 | 0 | 1 | 0 | 1 | 1 | 0 | 1 | 1 | 2 | 1 | 2 | 0 | 0 | 0 | 0 | 1 | 0 | ◎ | ○ | × | × | × | × | × |
| 12 | 0 | 1 | 0 | 2 | 1 | 0 | 2 | 1 | 3 | 2 | 3 | 0 | 0 | 0 | 0 | 2 | 0 | ◎ | ◎ | ○ | × | × | × | × |
| 13 | 0 | 1 | 1 | 0 | 1 | 1 | 0 | 2 | 1 | 1 | 2 | 0 | 0 | 0 | 1 | 0 | 0 | ◎ | ○ | × | × | × | × | × |
| 14 | 0 | 1 | 1 | 1 | 1 | 1 | 1 | 2 | 2 | 2 | 3 | 0 | 0 | 0 | 1 | 1 | 1 | ◎ | ◎ | ○ | × | × | × | × |
| 15 | 0 | 1 | 1 | 2 | 1 | 1 | 2 | 2 | 3 | 3 | 4 | 0 | 0 | 0 | 1 | 2 | 2 | ◎ | ◎ | ◎ | ○ | × | × | × |
| 16 | 0 | 1 | 2 | 0 | 1 | 2 | 0 | 3 | 1 | 2 | 3 | 0 | 0 | 0 | 2 | 0 | 0 | ◎ | ◎ | ○ | × | × | × | × |
| 17 | 0 | 1 | 2 | 1 | 1 | 2 | 1 | 3 | 2 | 3 | 4 | 0 | 0 | 0 | 2 | 1 | 2 | ◎ | ◎ | ◎ | ○ | × | × | × |
| 18 | 0 | 1 | 2 | 2 | 1 | 2 | 2 | 3 | 3 | 4 | 5 | 0 | 0 | 0 | 2 | 2 | 4 | ◎ | ◎ | ◎ | ◎ | ○ | × | × |
| 19 | 0 | 2 | 0 | 0 | 2 | 0 | 0 | 2 | 2 | 0 | 2 | 0 | 0 | 0 | 0 | 0 | 0 | ◎ | ○ | × | × | × | × | × |
| 20 | 0 | 2 | 0 | 1 | 2 | 0 | 1 | 2 | 3 | 1 | 3 | 0 | 0 | 0 | 0 | 2 | 0 | ◎ | ◎ | ○ | × | × | × | × |
| 21 | 0 | 2 | 0 | 2 | 2 | 0 | 2 | 2 | 4 | 2 | 4 | 0 | 0 | 0 | 0 | 4 | 0 | ◎ | ◎ | ◎ | ○ | × | × | × |
| 22 | 0 | 2 | 1 | 0 | 2 | 1 | 0 | 3 | 2 | 1 | 3 | 0 | 0 | 0 | 2 | 0 | 0 | ◎ | ◎ | ○ | × | × | × | × |
| 23 | 0 | 2 | 1 | 1 | 2 | 1 | 1 | 3 | 3 | 2 | 4 | 0 | 0 | 0 | 2 | 2 | 1 | ◎ | ◎ | ◎ | ○ | × | × | × |
| 24 | 0 | 2 | 1 | 2 | 2 | 1 | 2 | 3 | 4 | 3 | 5 | 0 | 0 | 0 | 2 | 4 | 2 | ◎ | ◎ | ◎ | ◎ | ○ | × | × |
| 25 | 0 | 2 | 2 | 0 | 2 | 2 | 0 | 4 | 2 | 2 | 4 | 0 | 0 | 0 | 4 | 0 | 0 | ◎ | ◎ | ◎ | ○ | × | × | × |
| 26 | 0 | 2 | 2 | 1 | 2 | 2 | 1 | 4 | 3 | 3 | 5 | 0 | 0 | 0 | 4 | 2 | 2 | ◎ | ◎ | ◎ | ◎ | ○ | × | × |
| 27 | 0 | 2 | 2 | 2 | 2 | 2 | 2 | 4 | 4 | 4 | 6 | 0 | 0 | 0 | 4 | 4 | 4 | ◎ | ◎ | ◎ | ◎ | ◎ | ○ | × |
| 28 | 1 | 0 | 0 | 0 | 1 | 1 | 1 | 0 | 0 | 0 | 1 | 0 | 0 | 0 | 0 | 0 | 0 | ○ | × | × | × | × | × | × |

FIG. 5

| STATE NO. | COOLING CAPABILITY POINT | | | | FAN COMBINATION POINT | | | | | | | | | | | | | | REQUIRED COOLING CONDITION POINT AND DECISION | | | | | | |
|---|---|---|---|---|---|---|---|---|---|---|---|---|---|---|---|---|---|---|---|---|---|---|---|---|---|
| | | | | | SUM OF POINTS | | | | | | | PRODUCT OF POINTS | | | | | | | | | | | | | |
| | FAN 1 | FAN 2 | FAN 3 | FAN 4 | ①<br>1+2 | ②<br>1+3 | ③<br>1+4 | ④<br>2+3 | ⑤<br>2+4 | ⑥<br>3+4 | ⑦<br>ALL | ①<br>1x2 | ②<br>1x3 | ③<br>1x4 | ④<br>2x3 | ⑤<br>2x4 | ⑥<br>3x4 | | 1 | 2 | 3 | 4 | 5 | 6 | 7 |
| 29 | 1 | 0 | 0 | 1 | 1 | 1 | 2 | 0 | 1 | 1 | 2 | 0 | 0 | 1 | 0 | 0 | 0 | | ◎ | ◎ | × | × | × | × | × |
| 30 | 1 | 0 | 0 | 1 | 1 | 1 | 2 | 0 | 1 | 1 | 2 | 0 | 0 | 1 | 0 | 0 | 0 | | ◎ | ◎ | ○ | × | × | × | × |
| 31 | 1 | 0 | 0 | 1 | 1 | 1 | 3 | 0 | 2 | 2 | 3 | 0 | 0 | 2 | 0 | 0 | 0 | | ◎ | ◎ | ◎ | × | × | × | × |
| 32 | 1 | 0 | 0 | 1 | 1 | 1 | 2 | 1 | 1 | 0 | 1 | 2 | 0 | 1 | 1 | 0 | 0 | 1 | ◎ | ◎ | ○ | × | × | × | × |
| 33 | 1 | 0 | 0 | 1 | 1 | 1 | 2 | 2 | 1 | 1 | 2 | 3 | 0 | 1 | 1 | 0 | 0 | 2 | ◎ | ◎ | ◎ | × | × | × | × |
| 34 | 1 | 0 | 0 | 1 | 1 | 1 | 2 | 3 | 1 | 2 | 3 | 4 | 0 | 1 | 2 | 0 | 0 | 2 | ◎ | ◎ | ◎ | ○ | × | × | × |
| 35 | 1 | 0 | 0 | 1 | 1 | 1 | 3 | 1 | 2 | 0 | 2 | 3 | 0 | 2 | 1 | 0 | 0 | 0 | ◎ | ◎ | ◎ | × | × | × | × |
| 36 | 1 | 0 | 0 | 1 | 1 | 1 | 3 | 2 | 2 | 1 | 3 | 4 | 0 | 2 | 1 | 0 | 0 | 2 | ◎ | ◎ | ◎ | ◎ | ○ | × | × |
| 37 | 1 | 0 | 1 | 0 | 2 | 1 | 1 | 1 | 1 | 1 | 2 | 0 | 1 | 0 | 0 | 0 | 0 | | ◎ | ◎ | ○ | × | × | × | × |
| 38 | 1 | 0 | 1 | 1 | 2 | 1 | 2 | 1 | 2 | 1 | 3 | 1 | 0 | 1 | 0 | 1 | 0 | | ◎ | ◎ | ◎ | × | × | × | × |
| 39 | 1 | 0 | 1 | 1 | 2 | 1 | 3 | 1 | 3 | 2 | 4 | 1 | 0 | 2 | 0 | 2 | 0 | | ◎ | ◎ | ◎ | ○ | × | × | × |
| 40 | 1 | 0 | 1 | 1 | 2 | 1 | 2 | 2 | 1 | 1 | 3 | 1 | 1 | 0 | 1 | 0 | 0 | | ◎ | ◎ | ◎ | × | × | × | × |
| 41 | 1 | 0 | 1 | 1 | 2 | 1 | 2 | 2 | 2 | 2 | 3 | 1 | 1 | 1 | 1 | 1 | 1 | | ◎ | ◎ | ◎ | ◎ | × | × | × |
| 42 | 1 | 0 | 1 | 1 | 2 | 1 | 2 | 3 | 2 | 3 | 4 | 5 | 1 | 1 | 2 | 1 | 2 | | ◎ | ◎ | ◎ | ◎ | ○ | × | × |
| 43 | 1 | 0 | 1 | 1 | 2 | 1 | 3 | 1 | 3 | 1 | 2 | 4 | 1 | 2 | 0 | 2 | 0 | | ◎ | ◎ | ◎ | ◎ | × | × | × |
| 44 | 1 | 0 | 1 | 1 | 2 | 1 | 3 | 2 | 3 | 2 | 3 | 4 | 1 | 2 | 2 | 2 | 1 | 2 | ◎ | ◎ | ◎ | ◎ | × | × | × |
| 45 | 1 | 0 | 1 | 1 | 2 | 1 | 3 | 2 | 3 | 3 | 4 | 5 | 1 | 2 | 2 | 2 | 2 | 4 | ◎ | ◎ | ◎ | ◎ | ○ | × | × |
| 46 | 1 | 0 | 1 | 1 | 2 | 1 | 3 | 3 | 3 | 4 | 6 | 1 | 2 | 0 | 3 | 0 | 0 | | ◎ | ◎ | ◎ | ◎ | ◎ | ○ | × |
| 47 | 1 | 0 | 1 | 1 | 3 | 1 | 1 | 2 | 2 | 3 | 1 | 4 | 2 | 0 | 0 | 1 | 0 | 0 | ◎ | ◎ | ◎ | × | × | × | × |
| 48 | 1 | 0 | 1 | 1 | 3 | 1 | 1 | 2 | 3 | 1 | 4 | 2 | 0 | 0 | 1 | 2 | 0 | 0 | ◎ | ◎ | ◎ | ◎ | × | × | × |
| 49 | 1 | 0 | 1 | 1 | 3 | 1 | 1 | 3 | 2 | 4 | 2 | 5 | 2 | 0 | 0 | 1 | 0 | 2 | ◎ | ◎ | ◎ | ◎ | ○ | × | × |
| 50 | 1 | 0 | 1 | 1 | 3 | 1 | 2 | 2 | 3 | 3 | 2 | 4 | 2 | 1 | 2 | 2 | 0 | | ◎ | ◎ | ◎ | ◎ | × | × | × |
| 51 | 1 | 0 | 1 | 1 | 3 | 1 | 2 | 2 | 3 | 3 | 5 | 2 | 1 | 0 | 2 | 2 | 1 | | ◎ | ◎ | ◎ | ◎ | ○ | × | × |
| 52 | 1 | 0 | 1 | 1 | 3 | 1 | 2 | 3 | 4 | 2 | 5 | 6 | 2 | 1 | 2 | 2 | 4 | 2 | ◎ | ◎ | ◎ | ◎ | ○ | × | × |
| 53 | 1 | 0 | 1 | 1 | 3 | 1 | 3 | 4 | 2 | 3 | 5 | 2 | 1 | 2 | 0 | 4 | 0 | | ◎ | ◎ | ◎ | ◎ | ◎ | ○ | × |
| 54 | 1 | 0 | 1 | 1 | 3 | 1 | 3 | 2 | 4 | 3 | 6 | 2 | 2 | 2 | 1 | 4 | 2 | | ◎ | ◎ | ◎ | ◎ | ◎ | ◎ | × |
| 55 | 1 | 0 | 1 | 1 | 3 | 1 | 3 | 3 | 4 | 4 | 7 | 2 | 2 | 2 | 4 | 4 | 4 | | ◎ | ◎ | ◎ | ◎ | ◎ | ◎ | ○ |
| 56 | 2 | 0 | 0 | 0 | 2 | 2 | 2 | 0 | 0 | 0 | 2 | 0 | 0 | 0 | 0 | 0 | 0 | | ◎ | ◎ | ○ | × | × | × | × |
| 57 | 2 | 0 | 0 | 0 | 2 | 2 | 3 | 0 | 1 | 1 | 3 | 0 | 0 | 2 | 0 | 0 | 0 | | ◎ | ◎ | ○ | ○ | × | × | × |
| 58 | 2 | 0 | 0 | 1 | 2 | 2 | 4 | 0 | 2 | 1 | 3 | 0 | 0 | 2 | 0 | 0 | 0 | | ◎ | ◎ | ○ | × | × | × | × |

FIG. 6

| STATE NO. | COOLING CAPABILITY POINT | | | | FAN COMBINATION POINT | | | | | | | | | | | | | REQUIRED COOLING CONDITION POINT AND DECISION | | | | | | |
|---|---|---|---|---|---|---|---|---|---|---|---|---|---|---|---|---|---|---|---|---|---|---|---|---|
| | | | | | SUM OF POINTS | | | | | | | PRODUCT OF POINTS | | | | | | | | | | | | |
| | FAN 1 | FAN 2 | FAN 3 | FAN 4 | ① 1+2 | ② 1+3 | ③ 1+4 | ④ 2+3 | ⑤ 2+4 | ⑥ 3+4 | ⑦ ALL | ① 1x2 | ② 1x3 | ③ 1x4 | ④ 2x3 | ⑤ 2x4 | ⑥ 3x4 | 1 | 2 | 3 | 4 | 5 | 6 | 7 |
| 59 | 2 | 0 | 1 | 1 | 2 | 3 | 3 | 1 | 1 | 2 | 4 | 0 | 2 | 2 | 0 | 0 | 1 | ◎ | ◎ | ◎ | ○ | × | × | × |
| 60 | 2 | 0 | 1 | 2 | 2 | 3 | 4 | 1 | 2 | 3 | 5 | 0 | 2 | 4 | 0 | 0 | 2 | ◎ | ◎ | ◎ | ○ | ○ | × | × |
| 61 | 2 | 0 | 2 | 1 | 2 | 4 | 3 | 2 | 1 | 3 | 5 | 0 | 4 | 2 | 0 | 0 | 2 | ◎ | ◎ | ◎ | ○ | ○ | × | × |
| 62 | 2 | 0 | 2 | 2 | 2 | 4 | 4 | 2 | 2 | 4 | 6 | 0 | 4 | 4 | 0 | 0 | 4 | ◎ | ◎ | ◎ | ○ | ◎ | ○ | × |
| 63 | 2 | 0 | 2 | 2 | 2 | 4 | 4 | 2 | 2 | 4 | 6 | 0 | 4 | 4 | 0 | 0 | 4 | ◎ | ◎ | ◎ | ○ | ◎ | ○ | × |
| 64 | 2 | 1 | 0 | 0 | 3 | 2 | 2 | 1 | 1 | 0 | 3 | 2 | 0 | 0 | 0 | 0 | 0 | ◎ | ◎ | ◎ | ○ | × | × | × |
| 65 | 2 | 1 | 0 | 1 | 3 | 2 | 3 | 1 | 2 | 1 | 4 | 2 | 0 | 2 | 0 | 1 | 0 | ◎ | ◎ | ◎ | ○ | × | × | × |
| 66 | 2 | 1 | 0 | 2 | 3 | 2 | 4 | 1 | 3 | 2 | 5 | 2 | 0 | 4 | 0 | 2 | 0 | ◎ | ◎ | ◎ | ○ | ○ | × | × |
| 67 | 2 | 1 | 1 | 0 | 3 | 3 | 2 | 2 | 1 | 1 | 4 | 2 | 2 | 0 | 1 | 0 | 0 | ◎ | ◎ | ◎ | ○ | × | × | × |
| 68 | 2 | 1 | 1 | 1 | 3 | 3 | 3 | 2 | 2 | 2 | 5 | 2 | 2 | 2 | 1 | 1 | 1 | ◎ | ◎ | ◎ | ○ | ○ | × | × |
| 69 | 2 | 1 | 1 | 2 | 3 | 3 | 4 | 2 | 3 | 3 | 6 | 2 | 2 | 4 | 1 | 2 | 2 | ◎ | ◎ | ◎ | ○ | ◎ | ○ | × |
| 70 | 2 | 1 | 2 | 0 | 3 | 4 | 2 | 3 | 1 | 2 | 5 | 2 | 4 | 0 | 2 | 0 | 0 | ◎ | ◎ | ◎ | ○ | ○ | × | × |
| 71 | 2 | 1 | 2 | 1 | 3 | 4 | 3 | 3 | 2 | 3 | 6 | 2 | 4 | 2 | 2 | 1 | 2 | ◎ | ◎ | ◎ | ○ | ◎ | ○ | × |
| 72 | 2 | 1 | 2 | 2 | 3 | 4 | 4 | 3 | 3 | 4 | 7 | 2 | 4 | 4 | 2 | 2 | 4 | ◎ | ◎ | ◎ | ◎ | ◎ | ◎ | ○ |
| 73 | 2 | 2 | 0 | 0 | 4 | 2 | 2 | 2 | 2 | 0 | 4 | 4 | 0 | 0 | 0 | 0 | 0 | ◎ | ◎ | ◎ | ○ | × | × | × |
| 74 | 2 | 2 | 0 | 1 | 4 | 2 | 3 | 2 | 3 | 1 | 5 | 4 | 0 | 2 | 0 | 2 | 0 | ◎ | ◎ | ◎ | ○ | ○ | × | × |
| 75 | 2 | 2 | 0 | 2 | 4 | 2 | 4 | 2 | 4 | 2 | 6 | 4 | 0 | 4 | 0 | 4 | 0 | ◎ | ◎ | ◎ | ○ | ◎ | ○ | × |
| 76 | 2 | 2 | 1 | 0 | 4 | 3 | 2 | 3 | 2 | 1 | 5 | 4 | 2 | 0 | 2 | 0 | 0 | ◎ | ◎ | ◎ | ○ | ○ | × | × |
| 77 | 2 | 2 | 1 | 1 | 4 | 3 | 3 | 3 | 3 | 2 | 6 | 4 | 2 | 2 | 2 | 2 | 1 | ◎ | ◎ | ◎ | ○ | ◎ | ○ | × |
| 78 | 2 | 2 | 1 | 2 | 4 | 3 | 4 | 3 | 4 | 3 | 7 | 4 | 2 | 4 | 2 | 4 | 2 | ◎ | ◎ | ◎ | ◎ | ◎ | ◎ | ○ |
| 79 | 2 | 2 | 2 | 0 | 4 | 4 | 2 | 4 | 2 | 2 | 6 | 4 | 4 | 0 | 4 | 0 | 0 | ◎ | ◎ | ◎ | ○ | ◎ | ○ | × |
| 80 | 2 | 2 | 2 | 1 | 4 | 4 | 3 | 4 | 3 | 3 | 7 | 4 | 4 | 2 | 4 | 2 | 2 | ◎ | ◎ | ◎ | ◎ | ◎ | ◎ | ○ |
| 81 | 2 | 2 | 2 | 2 | 4 | 4 | 4 | 4 | 4 | 4 | 8 | 4 | 4 | 4 | 4 | 4 | 4 | ◎ | ◎ | ◎ | ◎ | ◎ | ◎ | ◎ |

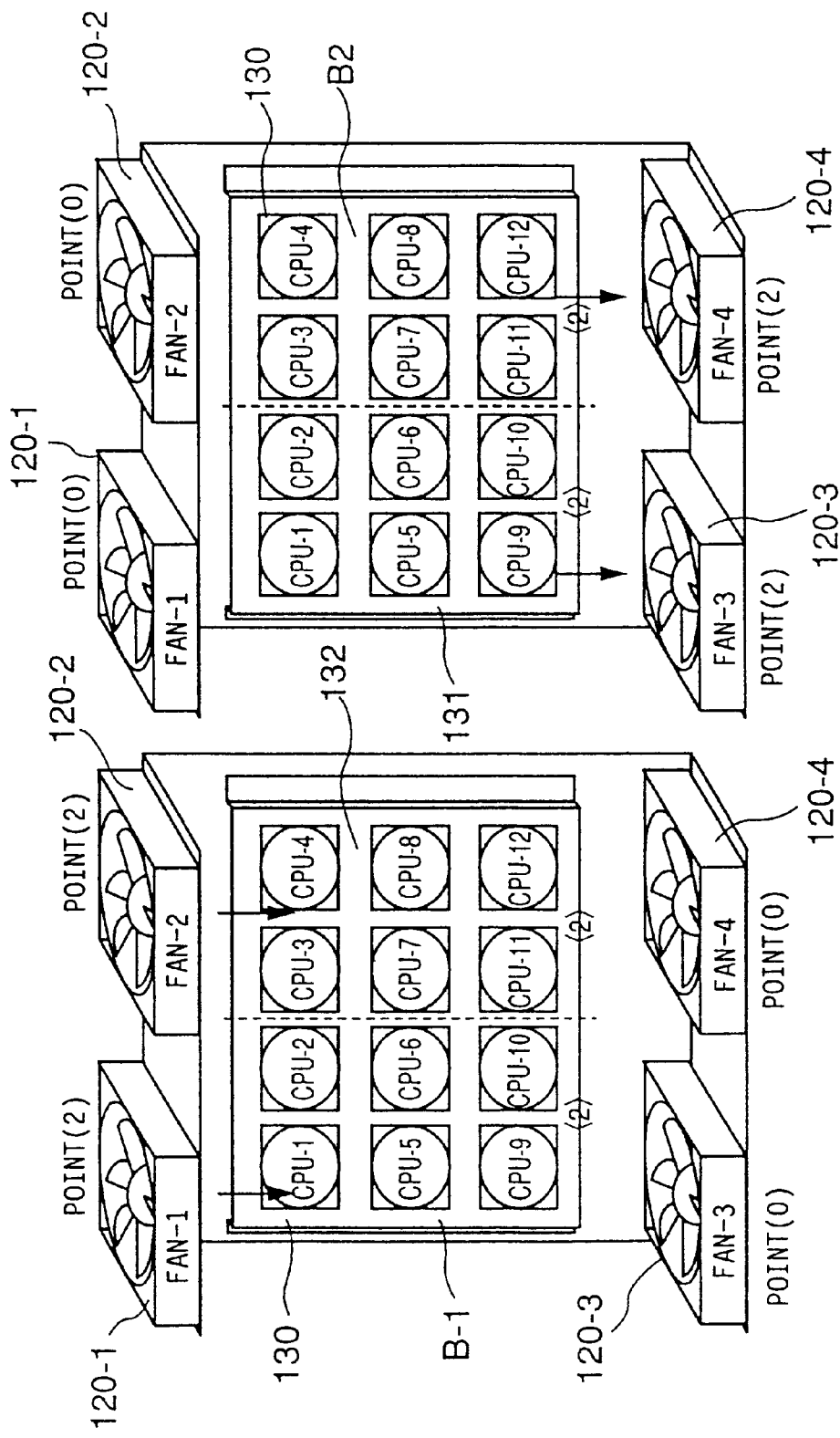

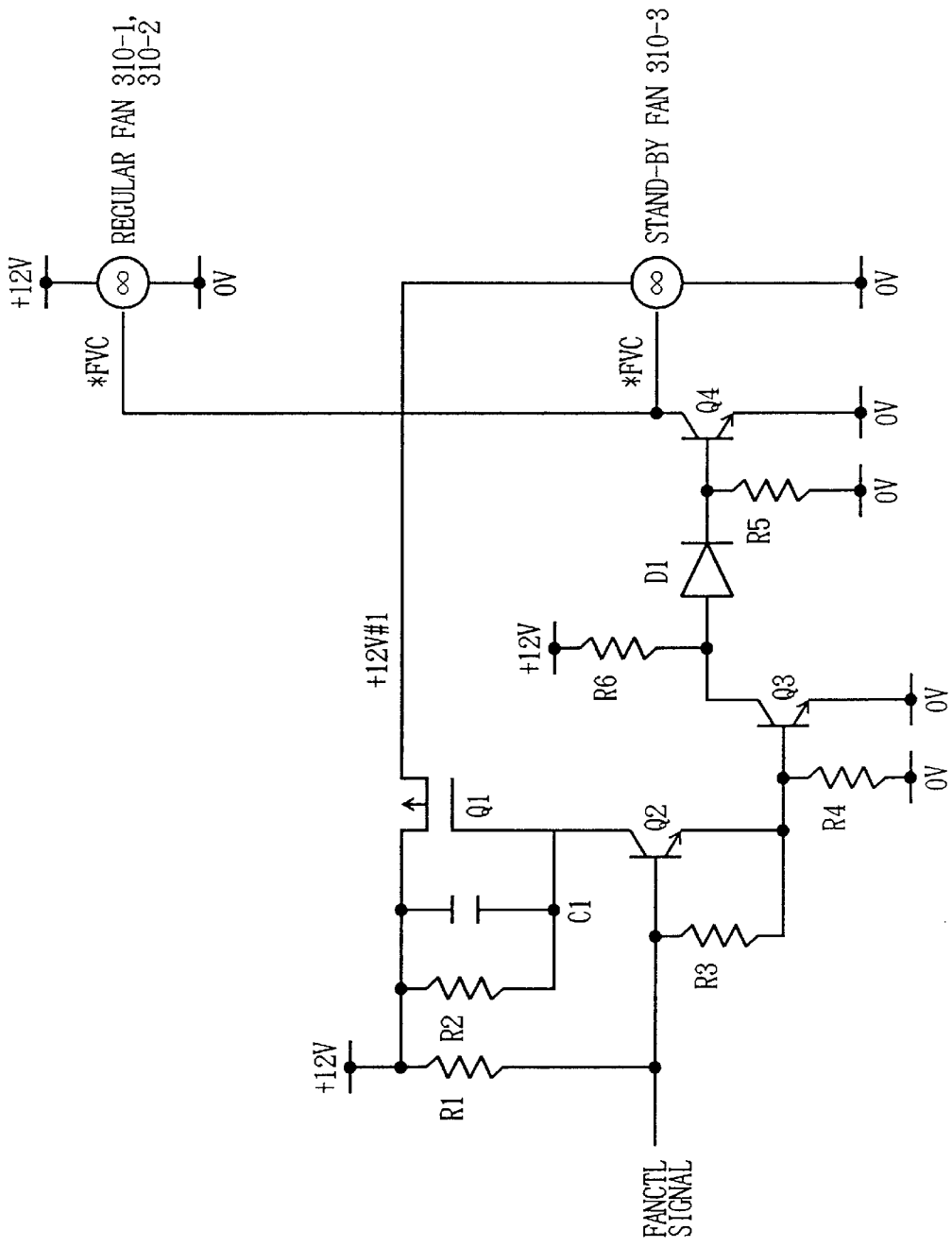
F I G. 1 4

FIG. 15

| REGULAR FAN | AMBIENT TEMPERATURE | | FAN FAULT | |
|---|---|---|---|---|
| STAND-BY FAN | NORMAL | ABNORMAL | REGULAR FAN | STAND-BY FAN |
| | LOW VELOCITY | HIGH VELOCITY | FAULT | LOW →HIGH VELOCITY |
| | STOP | HIGH VELOCITY | HIGH VELOCITY | FAULT |

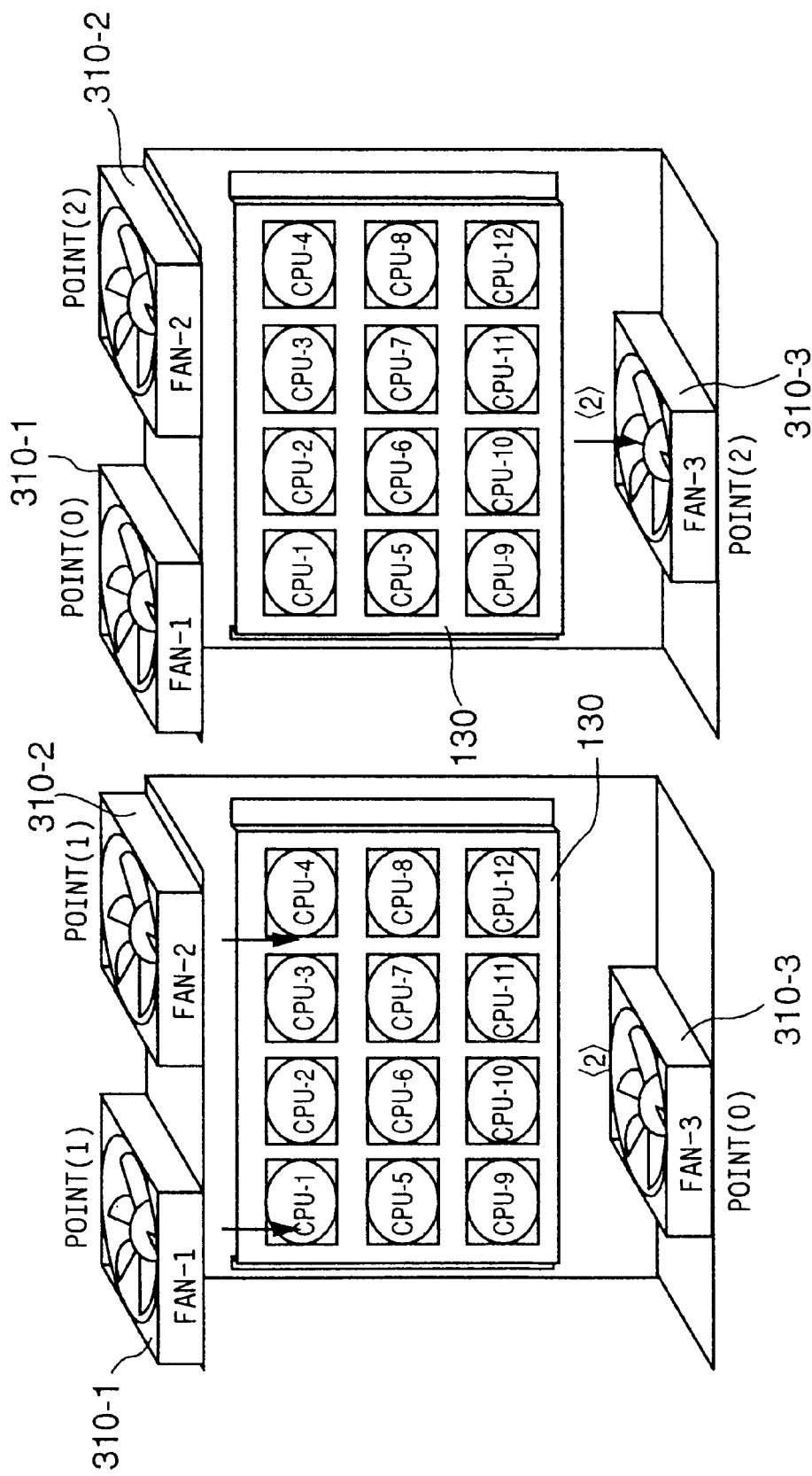

COOLING CONTROL APPARATUS

BACKGROUND OF THE INVENTION

1. Field of the Invention

The present application generally relates to cooling control apparatuses, and more particularly to a cooling control apparatus for controlling cooling of computer systems.

2. Description of the Related Art

Recently, computer systems are widely used and play important parts in various fields. Therefore, breakdown of a computer system may cause severe damages to our society. It is especially essential to realize stable operation of what is called server systems.

In order to achieve stable operation of server systems, it is necessary to assure that CPUs (Central Processing Units) work stably. Ambient temperature is one of factors which can affect stable operation of CPUs. Since CPUs can operate stably under relatively limited conditions, cooling control of the server systems is essential in view of improving system stability.

Conventional server systems usually operate for more than twelve hours in a day, and in addition, they are often set up in locations where many people pass by. Further, today's societies in the world are active for 24 hours. Therefore, systems must be designed from a viewpoint of unmanned operation under severe circumstances.

FIG. 1 is a diagram showing a CPU part of a conventional computer system. As shown in FIG.1, a plurality of CPUs 2-1 through 2-n are mounted on a circuit board 1. Fans 3-1 through 3-4 are mounted on the circuit board 1 for cooling the CPUs 2-1 through 2-n with fresh air.

The fans 3-1 through 3-4 are connected to a control device 4. The control device 4 monitors conditions of the fans 3-1 through 3-4 such as elapsed time or a total number of rotations since the fans were mounted. The control device 4 outputs a warning signal which indicates that the fans should be overhauled based on the monitored conditions and the life of the fans. The system administer can overhaul or replace a fan for which the warning signal has been output.

In the conventional cooling control apparatus, a fan for which the warning signal has been output is replaced even if the fan has sufficient cooling capability or the other fans can sufficiently cool the system. When a fan is replaced, operation of the system must be stopped. In addition, the conventional cooling control apparatus is so constructed that operation thereof is automatically stopped when a fan has failed even if other fans can perform sufficient cooling.

As described above, since the conventional cooling control apparatus monitors only an individual state of each of the fans, the computer system may be unnecessarily stopped due to replacement or failure of one of the fans. Thus, according to the conventional cooling control apparatus, computer systems cannot operate efficiently.

SUMMARY OF THE INVENTION

Accordingly, it is an object of the present invention to provide a cooling control apparatus which can improve the efficiency of a system by monitoring states of a plurality of cooling members as a whole.

The above object of the present invention is achieved by a cooling control apparatus for cooling a plurality of cooling members comprising: a monitor which monitors states of predetermined combinations of the cooling members; and a controller which controls the cooling members based on the states monitored by the monitor.

According to the invention, cooling members are controlled based on states of predetermined combinations of the cooling members. Hence, cooling control is performed in accordance with the states of the cooling members as a whole, and therefore, operation of a system which is to be cooled is not interrupted due to a trouble of an individual cooling member. As a result, it is possible to improve the efficiency of the operation of the system.

A cooling control apparatus for cooling a plurality of cooling members may comprise: a weight assignment part which assigns a weight to each of the cooling members; and a controller which controls the cooling members in accordance with the weights assigned to the cooling members.

Hence, states of the cooling members as a whole are indicated by the weights. Accordingly, cooling control of the system is performed in accordance with the states of the cooling members as a whole, and therefore, operation of a system which is to be cooled is not interrupted due to a trouble of an individual cooling member. As a result, it is possible to improve the efficiency of the operation of the system.

The weights may be determined in accordance with a cooling capability of each of the cooling members. In this case, cooling control is performed in accordance with the whole cooling capability of the cooling members.

The weight may also be determined in accordance with an importance of each of the cooling members. In this case, cooing control of the system is performed in accordance with importance of each of the cooling members. Hence, the operation of the system is not interrupted unless a severe trouble occurs.

The controller may recognize weights which correspond to required cooling conditions of the system and control the cooling members so that sums of predetermined combinations of the weights assigned to the cooling members are equal to or greater than the weights which correspond to the required cooling condition of the system.

A cooling control system which comprises a plurality of cooling members and the cooling control apparatus can perform efficient cooling.

Other objects and further features of the present invention will be apparent from the following detailed description when read in conjunction with the accompanying drawings.

BRIEF DESCRIPTION OF THE DRAWINGS

FIGS. 4 through 6 are diagrams showing an example of a data structure of a decision table of the cooling control apparatus of the first embodiment;

FIG. 9A is a diagram illustrating the operation of the cooling control apparatus of the first embodiment in a state No. 73;

FIG. 9B is a diagram illustrating the operation of the cooling control apparatus of the first embodiment in a state No. 9;

FIG. 14 is a circuit diagram of a power control circuit of the cooling control apparatus of the second embodiment;

FIG. 15 is a diagram illustrating the operation of the cooling control apparatus of the second embodiment; and FIGS. 16A, 16B, 17A, and 17B are diagrams illustrating the operation of the cooling control apparatus of the second embodiment in accordance with the cooling capability points for the fans.

DESCRIPTION OF THE PREFERRED EMBODIMENTS

Figure 1:
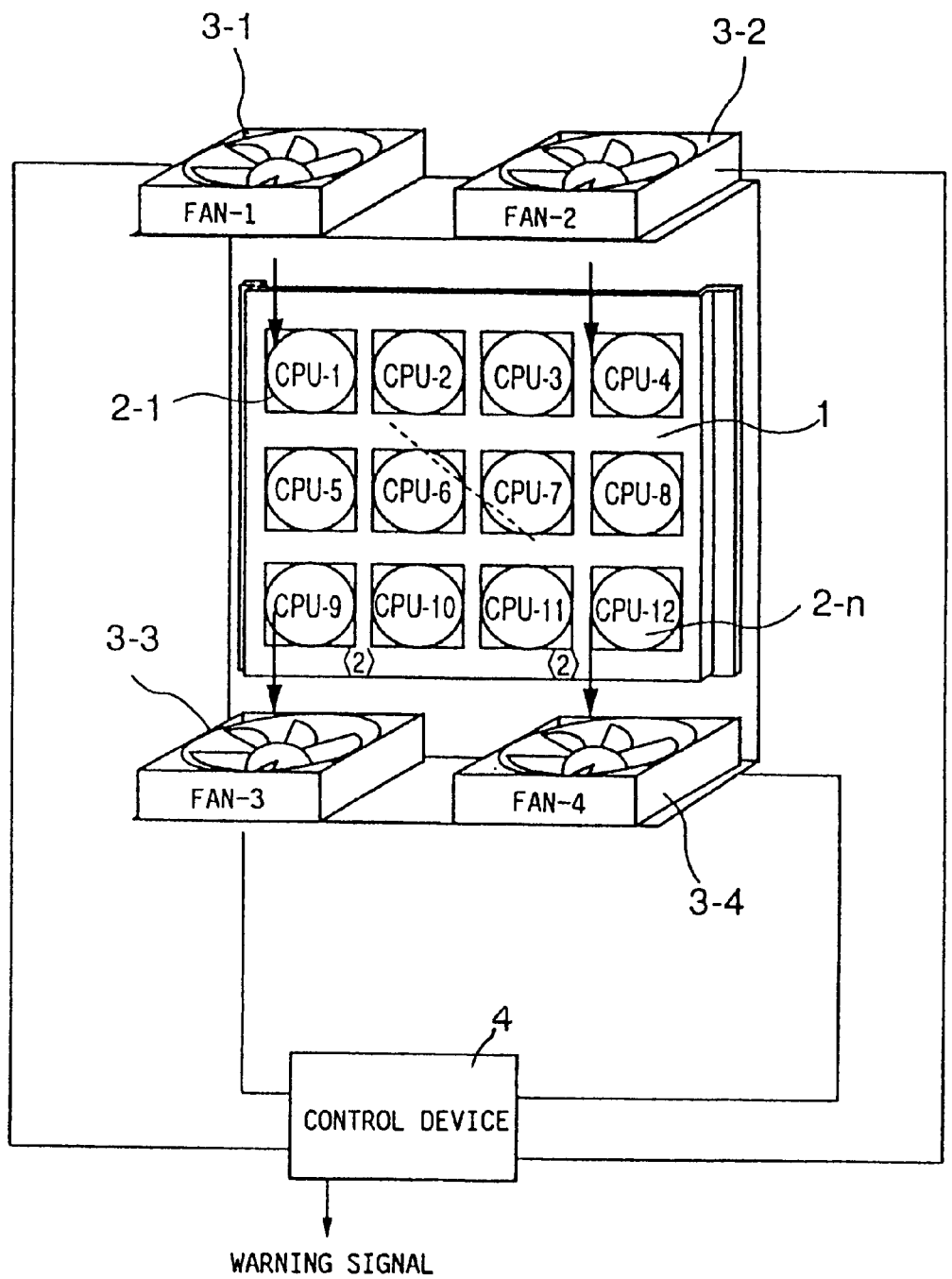
FIG. 1 is a diagram showing a CPU-part of a conventional computer system.
Figure 2:
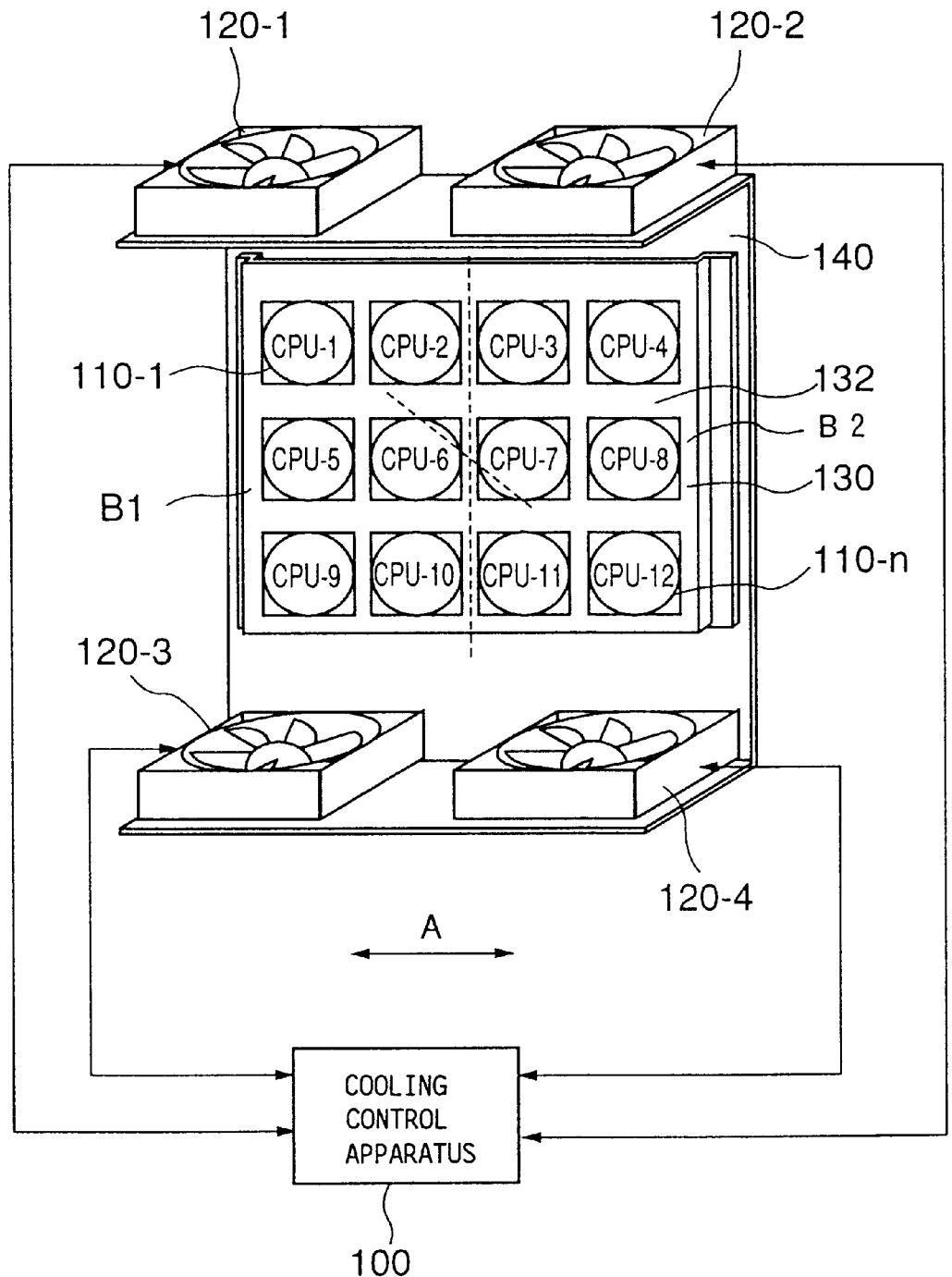
FIG. 2 is a diagram showing a system in which a cooling control apparatus of a first embodiment of the present invention is applied.

FIG. 2 is a diagram showing a system in which a cooling control apparatus 100 of a first embodiment according to the present invention is applied. The cooling control apparatus 100 of the present embodiment controls fans 120-1 through 120-4 which cool CPUs 110-1 through 110-n.

The CPUs 110-1 through 110-n are mounted on a circuit board 130. The circuit board 130 is disposed substantially in parallel with a support member 140. The fans 120-1 through 120-4 are supported in planes which are perpendicular to a plane of the support member 140. The fans 120-1 through 120-4 supply fresh air to the circuit board 130 to cool the CPUs 110-1 through 110-n. The fans 120-1 through 120-4 are connected to the cooling control apparatus 100.

The cooling control apparatus 100 detects ambient temperature of the circuit board 130 and states of the fans 120-1 through 120-4, and controls the operation of the fans 120-1 through 120-4.

Figure 3:
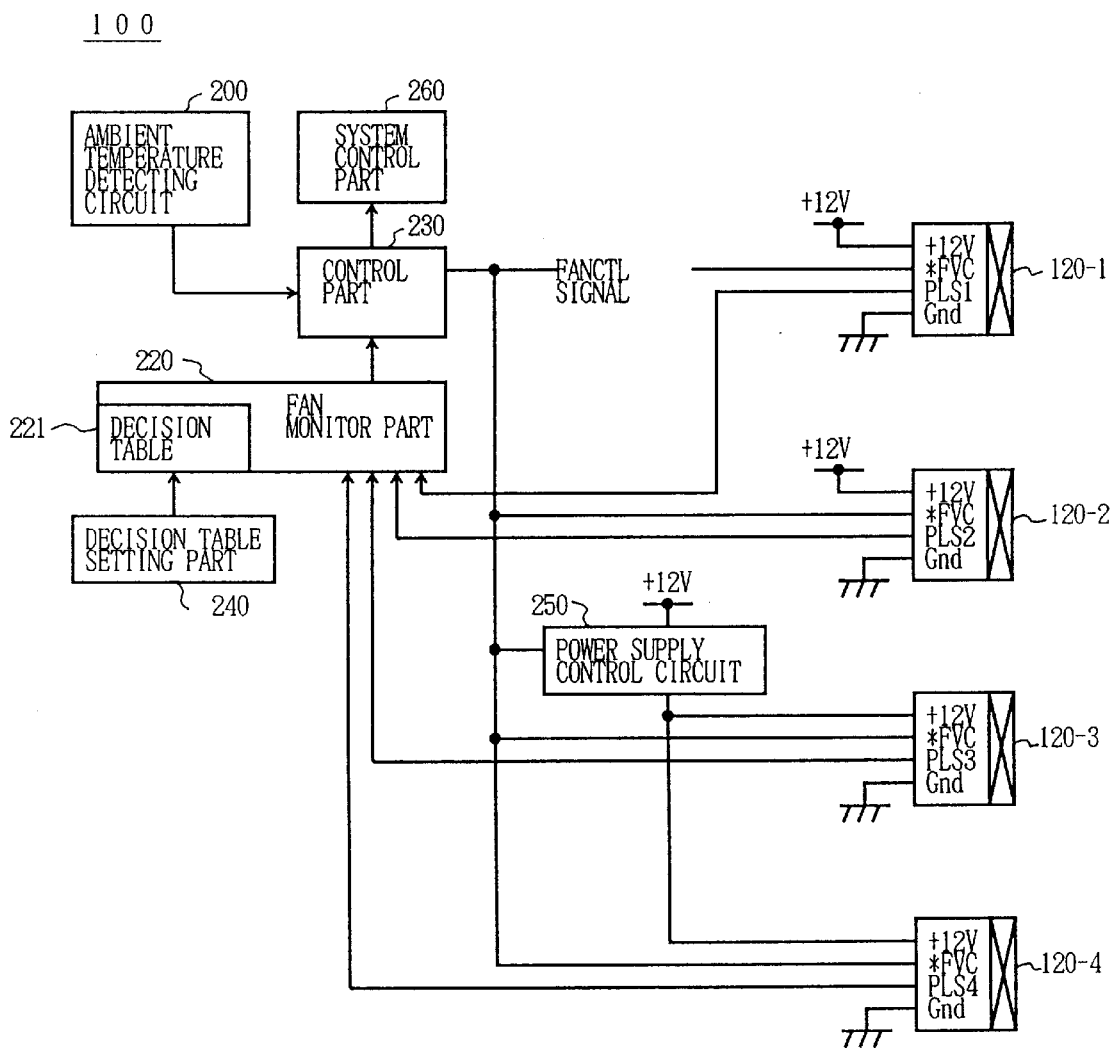
FIG. 3 is a block diagram of the cooling control apparatus of the first embodiment.

FIG. 3 is a block diagram of the cooling control apparatus 100 of the present embodiment. The cooling control apparatus 100 of the present embodiment comprises an ambient temperature detecting circuit 200, a fan monitor part 220, a control part 230, a decision table setting part 240, a power supply control circuit 250, and a system control part 260.

The ambient temperature detecting circuit 200 detects ambient temperature of the circuit board 130. The fan monitor part 220 monitors the states of the fans 120-1 through 120-4 referring to contents of a decision table 221 which has been established therein. The control part 230 controls rotation of the fans 120-1 through 120-4 by delivering a fan control signal thereto in response to command signals delivered from the ambient temperature detecting circuit 200 and the fan monitor part 220. The decision table setting part 240 sets points in the decision table 221 established in the fan monitor part 220, which points correspond to weight factors for each of the fans 120-1 through 120-4. The power supply control circuit 250 controls power supply to the fans 120-3 and 120-4 in response to a control signal delivered from the control part 230. The system control part 260 controls the whole system in accordance with a control signal delivered from the control part 230.

The ambient temperature detecting circuit 200 provides the control part 230 with a command signal which indicates whether the fan control signal should be turned ON or OFF in accordance with the detected ambient temperature. For example, when the detected temperature is higher than a predetermined temperature, the ambient temperature detecting circuit 200 supplies the control part 230 with a command signal which indicates that the fan control signal should be turned ON. On the other hand, when the detected temperature is lower than the predetermined temperature, the ambient temperature detecting circuit 200 supplies the control part 230 with a command signal which indicates that the fan control signal should be turned OFF.

The fan monitor part 220 is connected to pulse output terminals of the fans 120-1 through 120-4. Each of the fans 120-1 through 120-4 outputs a pulse signal having a frequency corresponding to the rotational velocity from the pulse output terminal. The fan monitor part 220 counts the number of the pulses and determines a point or a weight which indicates a cooling capability of each of the fans 120-1 through 120-4 based on the counted number of the pulses. The fan monitor part 220 determines whether sufficient cooling can be performed by the fans 120-1 through 120-4 referring to the decision table 221. The fan monitor part 220 then supplies the control part 230 with an indication signal which indicates whether sufficient cooling can be performed or not based on the result of the determination.

The fans 120-1, 120-2 are directly supplied with a power voltage (+12 V) of the system and therefore start to rotate when the power of the system is turned ON. On the other hand, the fans 120-3, 120-4 are supplied with the power voltage through the power supply control circuit 250. The power supply control circuit is constructed so that it supplies the power voltage to the fans 120-3, 120-4 only when the control part 230 outputs the fan control signal. Therefore, the fans 120-3, 120-4 start to rotate when the control part 230 outputs the fan control signal.

The CPUs 110-1 through 110-n on the circuit board 130 are divided into blocks B1 and B2 in a lateral direction (in a direction indicated by an arrow A shown in FIG. 2) at the center. The fans 120-1 and 120-3 cool the CPUs in the block B1, and the fans 120-2 and 120-4 cool the CPUs in the block B2.

The fans 120-1 through 120-4 are controlled so that a cooling condition required for each of the blocks B1 and B2 is satisfied. Each of the fans 120-1 through 120-4 has been assigned a cooling capability point which corresponds to a cooling capability thereof. Cooling conditions required for the blocks B1 and B2 have been determined.

The decision table 221 contains information as to whether sufficient cooling can be performed for each combination of the cooling capability points for the fans 120-1 through 120-4.

FIGS. 4 through 6 are diagrams showing an example of a data structure of the decision table 221 of the cooling control apparatus 100 of the present embodiment. In FIGS. 4 through 6, a cooling capability point of "0" indicates that a fan concerned is stopped. A cooling capability point of "1" indicates that a fan concerned normally works with a medium cooling capability, that is, the fan rotates at a low velocity. A cooling capability point of "2" indicates that a fan concerned normally works with a high cooling capability, that is, the fan rotates at a high velocity. A decision of "○" indicates that sufficient cooling can be performed. A decision of "⊙" indicates that cooling more than necessary can be performed. A decision of "X" indicates that sufficient cooling cannot be performed.

The decision table 221 consists of a "STATE NO." item, "COOLING CAPABILITY POINT" items for the fans 120-1 through 120-4, a "FAN COMBINATION POINT" item for making a decision based on combinations of the fans, and a "REQUIRED COOLING CONDITION POINT AND DECISION" item which contains decisions as to whether cooling can be performed or not for each of the required cooling condition points.

The "STATE NO." item contains eighty-one states of NO. 1 thorough NO. 81. Each of the eighty-one states corresponds to each combination of the cooling capability points for the fans 120-1 through 120-4.

The "COOLING CAPABILITY POINT" items contain cooling capability points for the fans 120-1 through 120-4 for each of the states NO. 1 through No. 81. The "FAN COMBINATION POINT" item consists of a "SUM OF POINTS" item and a "PRODUCT OF POINTS" item. The "SUM OF POINTS" item contains sums of the cooling capability points for specific combinations of two of the fans and a sum of the cooling capability points for all of the fans 120-1 through 120-4. The "PRODUCT OF POINTS" item contains products of the cooling capability points for specific combinations of two of the fans.

The "SUM OF POINTS" item consists of sub-items "①" through "⑦". The sub-item "①" contains a sum of the points for the fans 120-1 and 120-2; the sub-item "②" contains a sum of the points for the fans 120-1 and 120-3; the sub-item "③" contains a sum of the points for the fans 120-1 and 120-4; the sub-item "④" contains a sum of points for the fans 120-2 and 120-3; the sub-item "⑤" contains a sum of points for the fans 120-2 and 120-4; the sub-item "⑥" contains a sum of the points for the fans 120-3 and 120-4; and the sub-item "⑦" contains a sum of the points for the fans 120-1 through 120-4.

The "PRODUCT OF POINTS" item consists of sub-items "①" through "⑥". The sub-item "①" contains a product of the points for the fans 120-1 and 120-2; the sub-item "②" contains a product of the points for the fans 120-1 and 120-3; the sub-item "③" contains a product of the points for the fans 120-1 and 120-4; the sub-item "④" contains a product of the points for the fans 120-2 and 120-3; the sub-item "⑤" contains a product of the points for the fans 120-2 and 120-4; and the sub-item "⑥" contains a product of the points for the fans 120-3 and 120-4.

The "REQUIRED COOLING CONDITION POINT AND DECISION" item contains a decision of "◎", "○", or "X" for each of the required cooling condition points of "1" through "7".

In FIGS. 4 through 6, the state NO. 1, for example, corresponds to a state where all of the cooling capability points for the fans 120-1 through 120-4 are "0", that is, all of the fans 120-1 through 120-4 are stopped. In this case, all of the sub-items "①" through "⑦" of the "SUM OF POINTS" item and all of the sub-items "①" through "⑥" of the "PRODUCT OF POINTS" item are "0", indicating that no cooling can be performed. Consequently, decisions for the required cooling condition points "1" through "7" are set to "X".

In the state NO. 28, for example, the point for the fan 120-1 is "1" indicating that the fan has a medium cooling capability, and the points for the other fans 120-2 through 120-4 are "zero" indicating that these fans are stopped. In this case, the sub-items "①" through "③" and "⑦" of the "SUM OF POINTS" item are "1", and the sub-items "①" through "⑥" of the "PRODUCT OF POINTS" item are of "0", indicating that medium cooling with a cooling capability point of "1" can be performed by the fan 120-1. Consequently, the decision for the required cooling condition point "1" is set to "○" and the decisions for the required cooling points "2" through "7" are set to "X".

In the state NO. 81, for example, the cooling capability points for all of the fans 120-1 through 120-4 are "2" which corresponds to maximum cooling capability. In this case, the sub-items "①" through "⑥" and the sub-item "⑦" of the "SUM OF POINTS" of the "SUM OF POINTS" item are "4" and "8", respectively, and the sub-items "①" through "⑥" of the "PRODUCT OF POINTS" item are "4". This indicates that cooling with a cooling capability point of "8" can be performed by the fans 120-1 through 120-4. Consequently, the decisions for the required cooling condition points "1" through "7" are set to "◎" indicating that cooling with maximum cooling capability can be performed.

Figure 7:
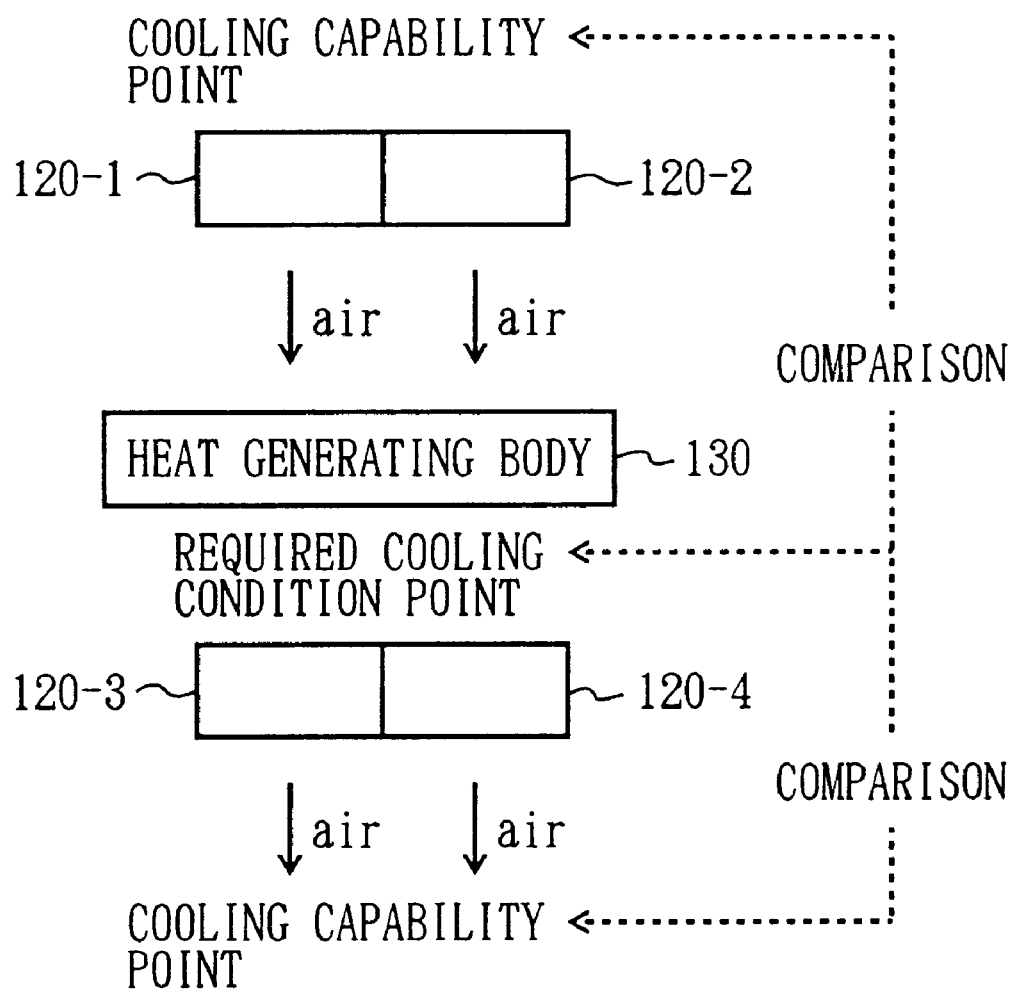
FIG. 7 is a diagram illustrating the operation a fan monitor part of the cooling control apparatus of the first embodiment.

FIG. 7 is a diagram illustrating the operation of the fan monitor part 220 of the cooling control apparatus 100 of the present embodiment. The fan monitor part 220 determines the cooling capability points for the fans 120-1 through 120-4 based on the number of the rotation pulses per unit time which are delivered from the fans. The fan monitor part 220 then compares the cooling capability points with the required cooling condition points contained in the decision table 221 and notifies the control part 230 whether sufficient cooling can be performed or not.

The contents of the decision table 221 can be set through the decision table setting part 240. Users of the system can operate the decision table setting part 240 to set combinations of fans and required cooling condition points corresponding to the combinations in accordance with a construction of a system. The fan monitor part 220 determines that sufficient cooling can be performed if sums of the cooling capability points for the combinations of the fans are equal to or greater than the corresponding required cooling condition points. On the contrary, the fan monitor part 220 determines that sufficient cooling cannot be performed if any of the sums are smaller than the corresponding required cooling condition points.

In the present embodiment, the fans 120-1 and 120-3 cooperate to cool the block B1 of the circuit board 130 and the fans 120-2 and 120-4 cooperate to cool the block B2 of the circuit board 130, as described above. Therefore, if the required cooling condition points for the blocks B1 and B2 are "2", the sum of the cooling capability points for the fans 120-1 and 120-3 and the sum of the cooling capability points for the fans 120-2 and 120-4 must be equal to or greater than "2", respectively. In this case, it is determined that sufficient cooling cannot be performed in states in which the sub-item "②" ("1"+"3") and/or the sub-item "⑤" ("2"+"4") of the "SUM OF POINTS" item are smaller than "2". That is, it is determined that sufficient cooling cannot be performed in states except the states NO. 9, 17, 18, 25, 26, 27, 33, 36, 41, 42, 44, 45, 49 through 54, 57, 60, 63, 65, 66, 68, 69, and 71 through 81 in the decision table 221.

Further, if the fans 120-3 and 120-4 are constructed so that they rotate and stop together, both of the cooling capability points for the fans 120-3 and 120-4 are equal to "0" in the states where the sub-item "⑥" (3×4) of the "PRODUCT OF POINTS" item is equal to "0". Thus, it is determined that sufficient cooling cannot be performed in the states where the sub-item "⑥" (3×4) of the "PRODUCT OF POINTS" item is equal to "0" and at least one of the cooling capability points for the fans 120-1 and 120-2 is smaller than "2". That is, it is determined that sufficient cooling cannot be performed in states except the states NO. 9, 17, 18, 26, 27, 33, 36, 41, 42, 44, 45, 50, 51, 53, 54, 60, 63, 68, 69, 71, 72, 77, 78, 80 and 81.

On the other hand, in a case where each of the fans 120-1 through 120-4 cool the whole circuit board 130 and the required cooling condition point for the whole circuit board 130 is "4", for example, the sum of the cooling capability points for the fans 120-1 through 120-4 must be equal to or greater than "4". In this case, it is determined that sufficient cooling cannot be performed in states in which sub-item "⑦" of the "SUM OF POINTS" item is smaller than "4". That is, it is determined that sufficient cooling cannot be performed in states except the states NO. 9, 15, 17, 18, 21, 23, 24, 25, 26, 27, 33, 35, 36, 39, 41, 42, 43, 44, 45, 47,48, 49, 50, 51, 52, 53, 54, 57, 59 through 63, and 65 through 81.

The fan monitor part 220 delivers a command signal to the control part 230 in accordance with the state of the fans 120-1 through 120-4.

The fans 120-1 and 120-2 start to rotate when the system is turned ON because the DC power voltage +12V is directly supplied thereto. On the other hand, the fans 120-3 and 120-4 are supplied with the DC power voltage through the power supply control circuit 250. The power supply control circuit 250 supplies the DC power voltage +12 V to the fans 120-3 and 120-4 when the fan control signal is set to ON. Consequently, the fans 120-3 and 120-4 start to rotate when the fan control signal is set to ON.

The control part 230 sets the fan control signal to ON or OFF in response to command signals delivered from the fan monitor part 220 and the ambient temperature detecting circuit 200. If the control part 230 receives a command signal which indicates that the fan control signal should be set to ON when the fan control signal has been already set to ON, the control part 230 determines that sufficient cooling of the system cannot be performed. In this case, the control part 230 delivers a signal to that effect to the system control part 260.

FIGS. 8, 9A, 9B, 10A, and 10B are diagrams illustrating the operations of the cooling control apparatus 100 of the present embodiment in several states. In these figures, the cooling capability points for the fans 120-1 through 120-4 are indicated by "(0)", "(1)", or "(2)", and the required cooling condition points for the blocks B1 and B2 are indicated by "<2>".

Figure 8:
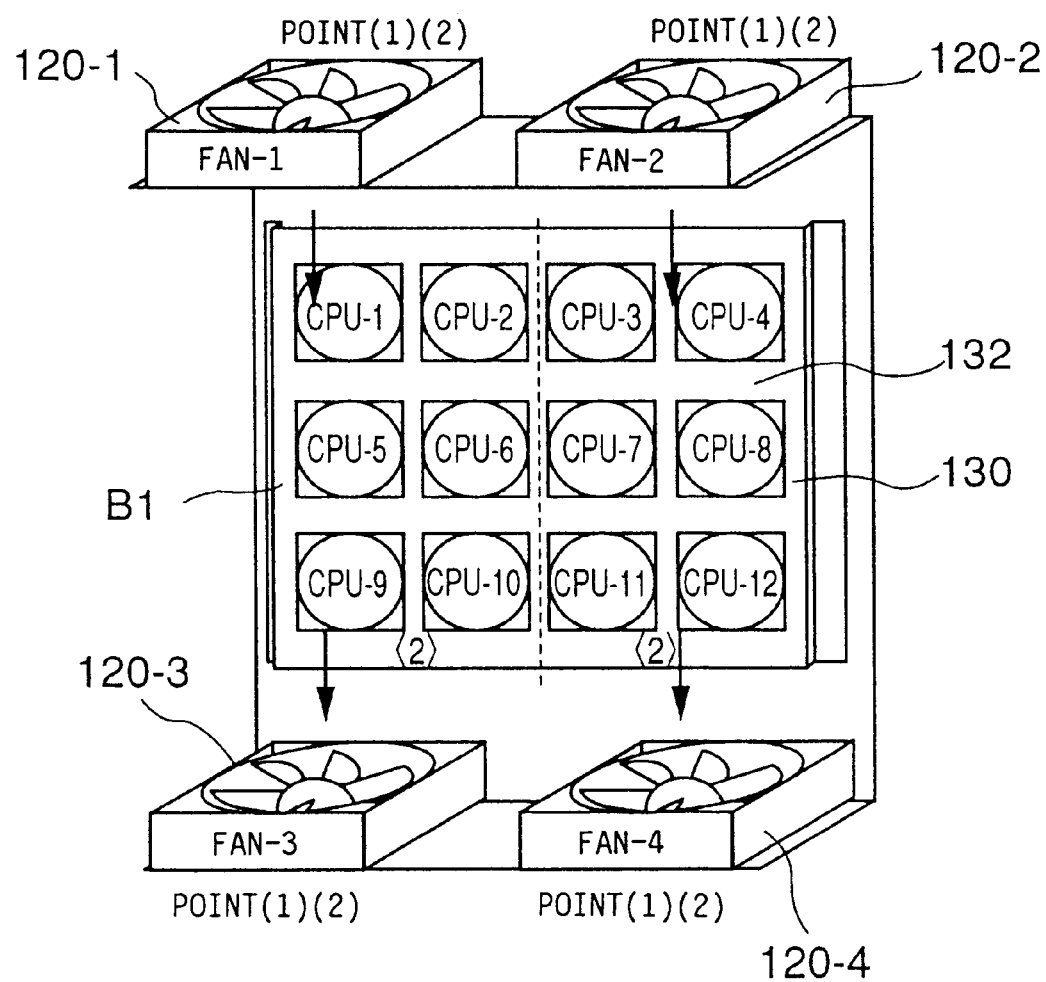
FIG. 8 is a diagram illustrating the operation of the cooling control apparatus of the first embodiment in a state No. 41 or No. 81.

FIG. 8 shows the state NO. 41 or NO. 81 in which all of the fans 120-1 through 120-4 operate with cooling capability points of "1" or "2". In these states, since the decision for the required cooling condition point of "4", of the circuit board 130 is "○" or "◎", it is determined that sufficient cooling of the circuit board 130 can be performed.

FIG. 9A shows the state NO. 73 in which the cooling capability points for the fans 120-1 and 120-2 are "2" and the cooling capability points for the fans 120-3 and 120-4 are "0". In this state, as the decision for the required cooling condition point of "4" of the circuit board 130 is "○", it is determined that sufficient cooling can be performed.

FIG. 9B shows the state NO. 9 in which the cooling capability points for the fans 120-1 and 120-2 are "0" and the cooling capability points for the fans 120-3 and 120-4 are "2". In this state, as the decision for the required cooling condition point "4" required for the circuit board 130 is "○", it is determined that sufficient cooling of the circuit board 130 can be performed.

Figure 10A:
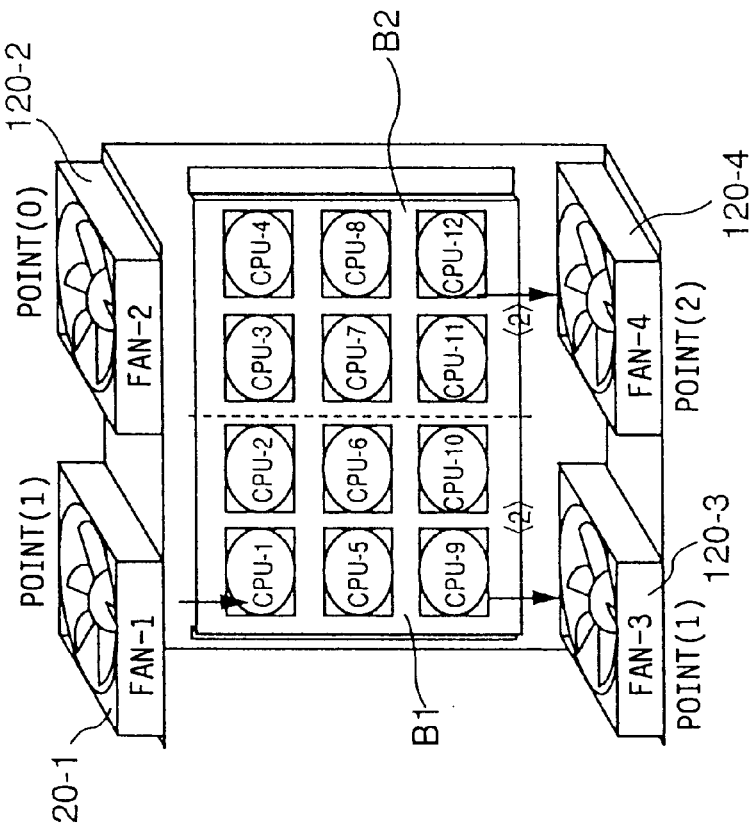
FIG. 10A is a diagram illustrating the operation of the cooling control apparatus of the first embodiment in a state No. 17.

FIG. 10A shows the state NO. 17 in which the cooling capability points for the fan 120-1, the fan 120-2, the fan 120-3 which cooperates with the fan 120-1, and the fan 120-4 which cooperates with the fan 120-2 are "0", "1", "2", and "1", respectively. In this state, as the decision for the required cooling condition point of "4" for the circuit board 130 is "○", it is determined that sufficient cooling of the circuit board 130 can be performed.

Figure 10B:
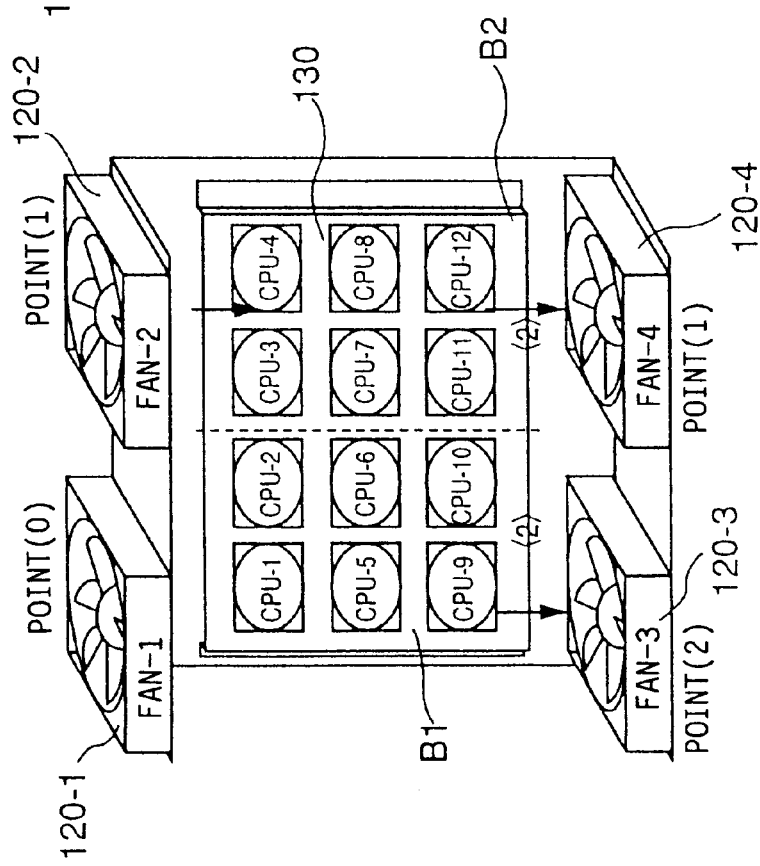
FIG. 10B is a diagram illustrating the operation of the cooling control apparatus of the first embodiment in a state No. 33.

FIG. 10B shows the state NO. 33 in which the points for the fan 120-1, the fan 120-2, the fan 120-3 which cooperates with the fan 120-1, and the fan 120-4 which cooperates with the fan 120-2 are "1", "0", "1" and "2", respectively. In this state, as the decision for the required cooling condition point of "4" for the circuit board 130 is "○", it is determined that sufficient cooling of the circuit board 130 can be performed.

In the present embodiment, the fans 120-1 and 120-3 perform cooling of the block B1 of the circuit board 130, and the fans 120-2 and 120-4 perform cooling of the block B2 of the circuit board 130, as described above. However, the present invention can be applied to a construction in which each fan performs cooling of the whole circuit board 130.

In addition, although FIG. 7 illustrates a situation in which the fans perform cooling of a single heat generating body (that is, the circuit board 130), the fans may perform cooling of a plurality of heat generating bodies. In a case where each fan performs cooling of a plurality of heat generating bodies, determination regarding cooling capability is carried out for each of the heat generating bodies. In this case, the cooling capability point for each of the fans may be determined corresponding to each of the heat generating bodies. In addition, the cooling capability points for the fans may be determined in accordance with contributions thereof in performing the cooling of a system and/or importance in the system of a heat generating body which is to be cooled thereby. It is also possible to adjust the cooling capability points for the fans and the required cooling condition points for the heat generating bodies in accordance with ambient temperature and other factors.

Figure 11:
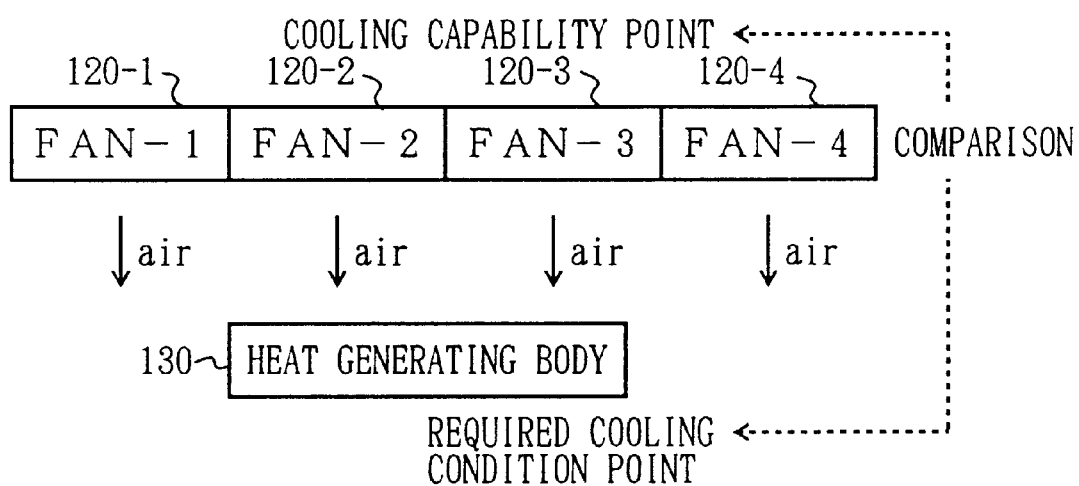
FIG. 11 is a diagram illustrating the operation of a modified example of the cooling control apparatus of the first embodiment.

FIG. 11 shows a modified example of the cooling control apparatus of the first embodiment according to the present invention. As shown in FIG. 11, each of the fans 120-1 through 120-4 cools the whole circuit board 130. In this case, the determination regarding cooling capability is carried out by comparing the sum of the cooling capability points for the fans 120-1 through 120-4 and the required cooling condition point for the circuit board 130. More specifically, it is determined that cooling can be performed if the sub-item "⑦" of the "SUM OF POINTS" item in the decision table 221 shown in FIGS. 3 through 5 is equal to or greater than the required cooling condition point. Otherwise, it is determined that cooling cannot be performed.

Figure 12:
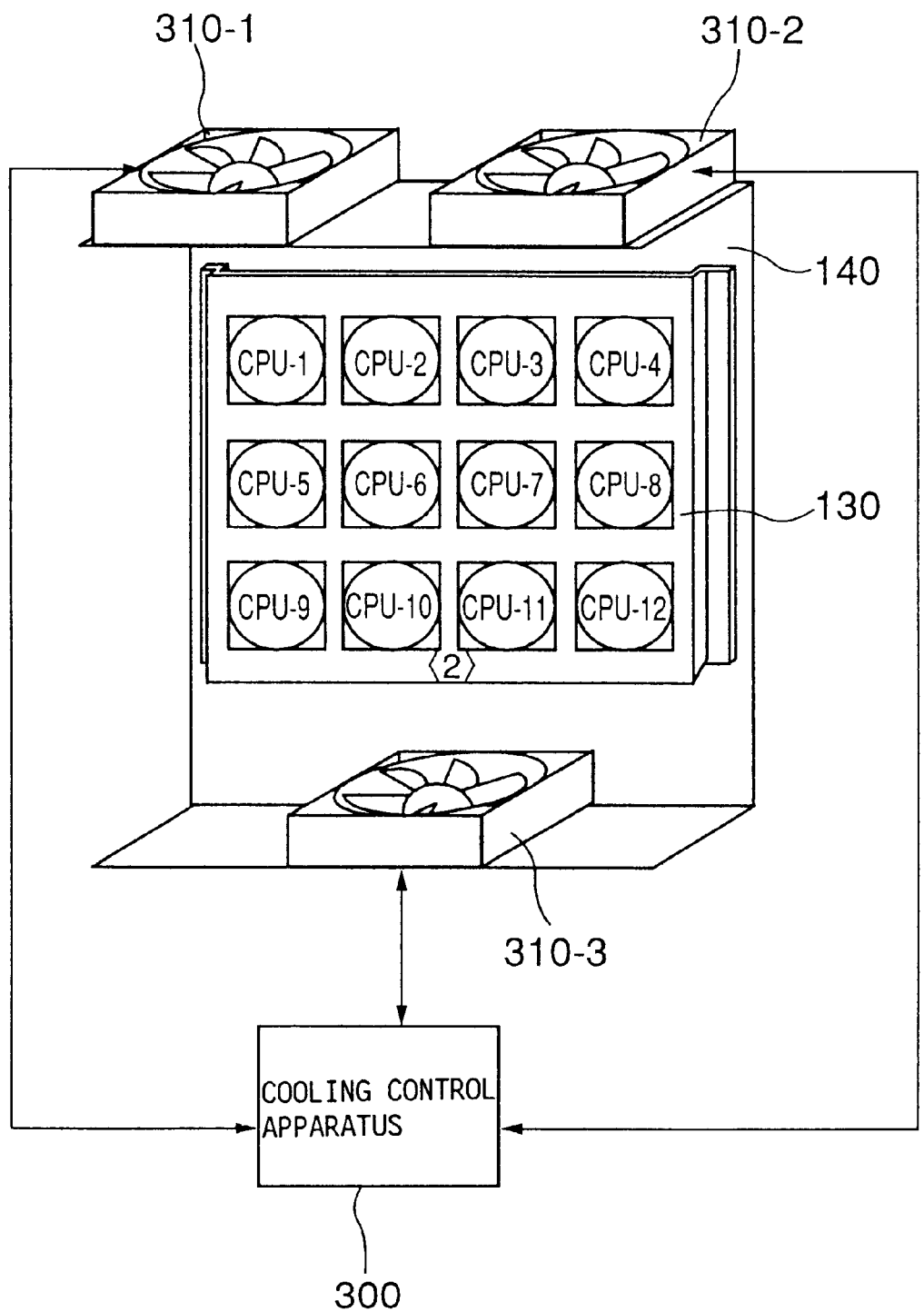
FIG. 12 is a diagram showing a system in which a cooling control apparatus of a second embodiment of the present invention is applied.

FIG. 12 is a diagram showing a system in which a second embodiment of a cooling control apparatus according to the present invention is applied. In FIG. 12, those parts which are the same as those corresponding parts in FIG. 2 are designated by the same reference numerals, and a description thereof will be omitted.

As shown in FIG. 12, a cooling control apparatus 300 of the second embodiment is applied to a system which comprises two regular fans 310-1 and 310-2 mounted on the top of the support member 140 and a stand-by fan 310-3 mounted on the bottom of the support member 140.

The regular fans 310-1 and 310-2 regularly rotate to cool the circuit board 130. On the other hand, the stand-by fan 310-3 operates only when the cooling capability points of the regular fans 310-1 and/or 310-2 drop due to troubles so that the sum of the cooling capability points for the regular fans 310-1, 310-2 and the stand-by fan 310-3 is maintained greater than the required cooling condition point for the circuit board 130. Thus, it is possible to prevent the interruption of the operation of the system when the regular fans 310-1 and/or 310-2 are at fault.

The regular fans 310-1, 310-2 and the stand-by fan 310-3 can rotate at two different velocities. When the control signal (*FVC) is at a high level, the fans rotate at a high velocity. When the control signal (*FVC) is at a low level, the fans rotate at a low velocity.

Figure 13:
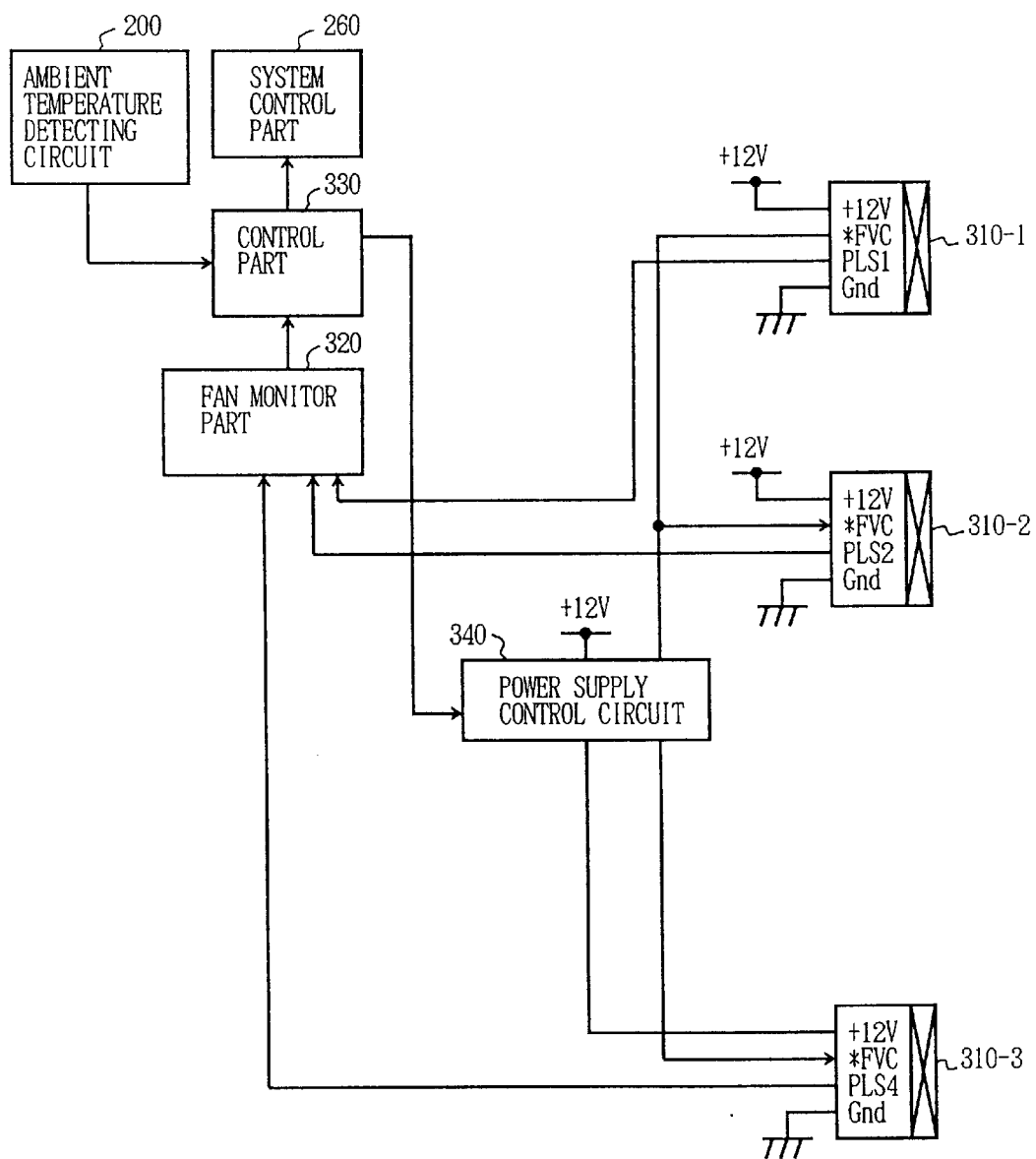
FIG. 13 is a block diagram of the cooling control apparatus of the second embodiment.

FIG. 13 is a block diagram showing the cooling control apparatus 300 of the second embodiment. In FIG. 13, those parts which are the same as those corresponding parts in FIG. 3 are designated by the same reference numeral, and a description thereof will be omitted.

The cooling control apparatus 300 of the second embodiment differs from the cooling control apparatus 100 of the first embodiment shown in FIG. 2 in operations of a fan monitor part 320 and a control part 330 and a construction of a power supply control circuit 340.

The fan monitor part 320 monitors rotation pulses PLS delivered from the regular fans 310-1, 310-2 and the stand-by fan 310-3 and detects rotational velocities thereof. If a rotational velocity of a fan is equal to or greater than a predetermined rotational velocity R0, the fan monitor part 320 sets the cooling capability point for the fan concerned to "2" and determines that the fan is rotating at a high velocity. If a rotational velocity of a fan is equal to or smaller than a predetermined rotational velocity R1 which is smaller than the predetermined rotational velocity R0, the fan monitor part 320 sets the cooling capability point for the fan concerned to "0" and determines that the fan is stopped. If a rotational velocity of a fan is between the predetermined rotational velocities R1 and R0, the fan monitor part 320 sets the cooling capability point for the fan concerned to "1" and determines that the fan is rotating at a low velocity.

The fan monitor part 320 supplies a high-level command signal to the control part 330 when the rotational velocity of the regular fan 310-1 or 310-2 decreases, that is, when the sum of the cooling capability points for the regular fans 310-1 and 310-2 is smaller than a required cooling capability condition point of "2" for the circuit board 130. The control part 330 sets the fan control signal (FANCTL) to a high level when the high-level command signal is received from the fan monitor part 320.

In the second embodiment, only the regular fans 310-1 and 310-2 are regularly rotated, as described above. However, the stand-by fan 310-3 may also be regularly rotated and the state thereof may be monitored. In this case, the fan control signal (FANCTL signal) is maintained at a high level.

The ambient temperature detecting circuit 200 delivers a high-level detection signal to the control part 330 when the detected temperature is higher than a predetermined temperature. On the other hand, the ambient temperature detecting circuit 200 delivers a low-level detection signal to the control part 330 when the detected temperature is lower than the predetermined temperature. The control part 330 sets the fan control signal (FANCTL signal) to a high level when the high-level detection signal is received from the ambient temperature detecting circuit 200. On the other hand, the control part 330 sets the fan control signal (FANCTL signal) to a low level when the low-level detection signal is received from the ambient temperature detecting circuit 200. The control part 330 delivers the fan control signal (FANCTL signal) to the power supply control circuit 340.

FIG. 14 is a circuit diagram of the power supply circuit 340 of the cooling control apparatus 300 of the second embodiment according to the present invention. As shown in FIG. 14, the power supply circuit 340 comprises transistors Q1 through Q4, resistors R1 through R6, a condenser C1, and a diode D1. The power supply circuit 340 controls the operation of the regular fans 310-1, 310-2 and the stand-by fan 310-3 in response to the fan control signal delivered thereto from the control part 330.

When the fan control signal is at a low level, the transistor Q2 is turned OFF. When the transistor Q2 is turned OFF, the gate of the transistor Q1 is at a high level and therefore the transistor Q1 is turned OFF. In this case, the stand-by fan 310-3 is stopped as the power voltage +12V supplied thereto is cut off.

When the transistor Q2 is turned OFF, the transistor Q3 is also turned OFF. In this case, the transistor Q4 is turned ON as the base thereof is at a high level. When the transistor Q4 is turned ON, the control signal (*FVC) for the regular fans 310-1, 310-2 is at a low level. Thus, the regular fans 310-1, 310-2 rotate at a low velocity.

When the fan control signal is at a high level, the transistor Q2 is turned ON. When the transistor Q2 is turned ON, the gate of the transistor Q1 is at a low level and therefore the transistor Q1 is turned ON. In this case, the stand-by fan 310-3 rotates as it is supplied with the power voltage +12V through the transistor Q1.

When the transistor Q2 is turned ON, the transistor Q3 is also turned ON. In this case, the transistor Q4 is turned OFF as the base thereof is at a low level. When the transistor Q4 is turned OFF, the control signal (*FVC) for the regular fans 310-1, 310-2 and the stand-by fan 310-3 is at a high level. Thus, the regular fans 310-1, 310-2 and the stand-by fan 310-3 rotate at a high velocity with a cooling capability point "2".

In the second embodiment, the stand-by fan 310-3 can rotate at two different velocities as described above. However, the stand-by fan 310-3 may be a fan which can rotate only at a high velocity.

FIG. 15 is a diagram illustrating the operation of the cooling control apparatus 300 of the second embodiment. The cooling control apparatus 300 can perform cooling control which is adaptive to both of ambient temperature and states of the fans by using the one-bit fan control signal.

As shown in FIG. 15, when the ambient temperature detected by the ambient temperature detecting circuit 200 is lower than a predetermined temperature, it is determined that the ambient temperature is in a normal condition. In this case, the fan control signal is set to a low level. Thus, the regular fans 310-1, 310-2 rotate at a low velocity and the stand-by fan 310-3 is stopped.

On the other hand, when the ambient temperature detected by the ambient temperature detecting circuit 200 is higher than a predetermined temperature, it is determined that the ambient temperature is in an abnormal condition. In this case, the fan control signal is set to a high level. Thus, the regular fans 310-1, 310-2 rotate at a high velocity and the stand-by fan 310-3 also rotates at a high velocity. As a result, the circuit board 130 is sufficiently cooled with a sum of the cooling capability points for the regular fans 310-1, 310-2 and the stand-by fan 310-3 being "6", and therefore the ambient temperature can be lowered to a normal condition.

When the cooling capability points for the regular fan 310-1 or 310-2 drop, it is determined that the regular fan 310-1 or 310-2 is at fault. In this case, the fan control signal is set to a high level. When the fan control signal is at a high level, the stand-by fan 310-3 and either of the regular fans 310-1 and 310-2 which is not at fault rotate at a high velocity. As a result, the circuit board 130 is cooled with a sum of cooling capability points for the regular fans 310-1 or 310-2 and the stand-by fan 310-3 being "4", and therefore the ambient temperature can be maintained in a normal condition.

In a case where the stand-by fan 310-3 is regularly rotated and monitored by the fan monitor part 320, if the cooling capability point for the stand-by fan 310-3 drops, it is determined that the stand-by fan 310-3 is at fault. In this case, the fan control signal is set to a high level so that the regular fans 310-1, 310-2 rotate at a high velocity. As a result, the circuit board 130 is cooled with a sum of cooling capability points for the regular fans 310-1, 310-2 being "4", and therefore the ambient temperature can be maintained in a normal condition.

Figure 17A:
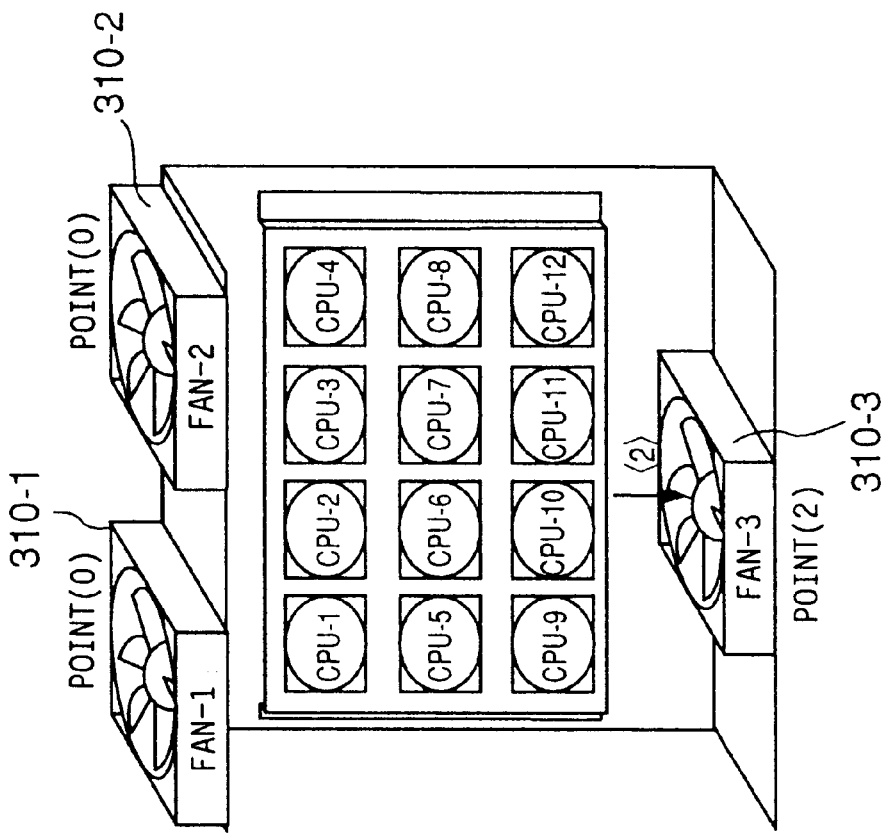
Figure 17B:
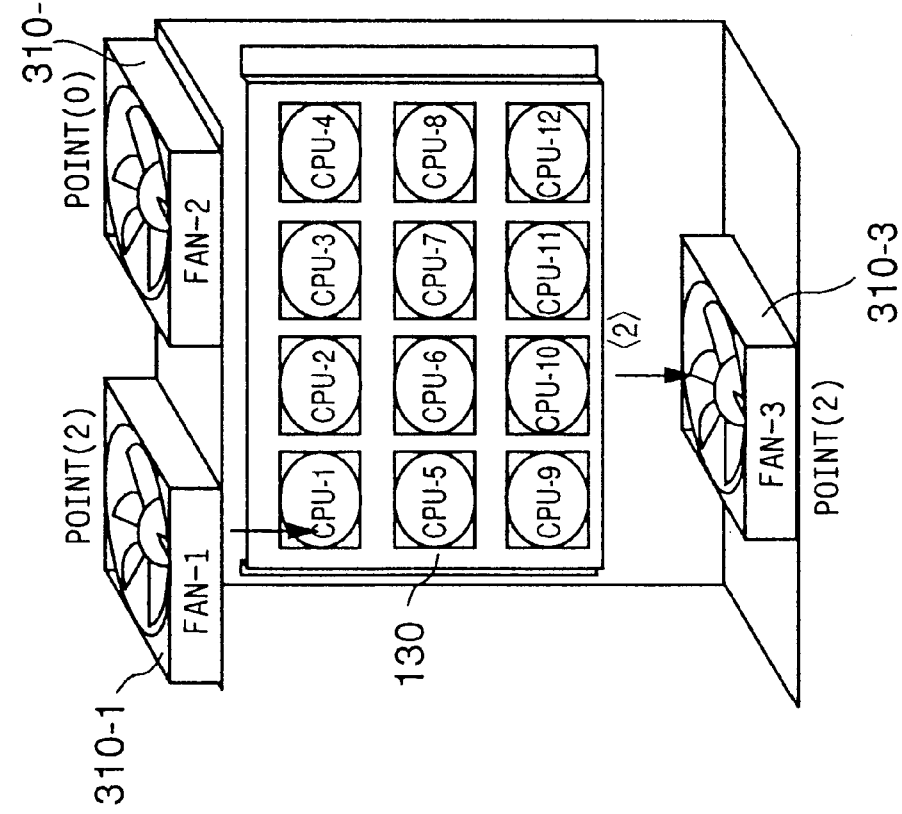

FIGS. 16A, 16B, 17A and 17B are diagrams illustrating operations of the cooling control apparatus 300. FIG. 16A shows a state where the cooling control apparatus 300 works normally. FIG. 16B shows a state where the regular fan 310-1 is at fault. FIG. 17A shows a state where the regular fan 310-2 is at fault. FIG. 17B shows a state where both of the regular fans 310-1 and 310-2 are at fault.

When the cooling control apparatus 300 works normally, both of the regular fans 310-1 and 310-2 rotate at a low velocity with the cooling capability points of "1" as shown in FIG. 16A. Therefore the circuit board 130 can be sufficiently cooled with the required cooling condition point of "2" being satisfied. In this case, the regular fans 310-1 and 310-2 are not overloaded because they rotate at a low velocity.

When the regular fan 310-1 is at fault and the cooling capability point thereof is "0", the regular fan 310-2 and the stand-by fan 310-3 rotate at a high velocity with cooling capability points of "2" as shown in FIG. 16B. Thus, the circuit board 130 can be sufficiently cooled with a sum of cooling capability points being "4".

When the regular fan 310-2 is at fault and the cooling capability point thereof is "0", the regular fan 310-1 and the stand-by fan 310-3 rotate at a high velocity with cooling capability points of "2" as shown in FIG. 17A. Thus, the circuit board 130 can be sufficiently cooled with a sum of cooling capability points being "4".

When both of the regular fans 310-1 and 310-2 are at fault and the cooling capability points thereof are "0", the stand-by fan 310-3 rotates at a high velocity with a cooling capability point of "2". Thus, the circuit board 130 can be sufficiently cooled with a sum of cooling capability points being "2".

As described above, the cooling control apparatus 300 of the second embodiment can control the cooling of the circuit board 130 in accordance with both of the ambient temperature and the states of the fans 310-1 through 310-3 by using the one-bit fan control signal.

In the above two embodiments, descriptions were given of cooling control apparatuses which control cooling of CPUs of a computer system. However, the present invention can be generally applied to control of cooling of heat generating bodies.

Further, the present invention is not limited to these embodiments, but variations and modifications may be made without departing from the scope of the present invention.

What is claimed is:

1. A cooling control apparatus for controlling a plurality of cooling members, comprising:
   a monitor which monitors states of predetermined combinations of said cooling members; and
   a controller which controls said cooling members based on said states monitored by said monitor.

2. A cooling control apparatus for controlling a plurality of cooling members, comprising:
   a weight assignment part which assigns a weight to each of said cooling members; and
   a controller which controls said cooling members in accordance with said weights assigned to said cooling members.

3. The cooling control apparatus as claimed in claim 2, wherein said weight is determined in accordance with a cooling capability of each of said cooling members.

4. The cooling control apparatus as claimed in claim 2, wherein said weight is determined in accordance with an importance of each of said cooling members.

5. The cooling control apparatus as claimed in claim 2, wherein said controller recognizes weights which correspond to required cooling conditions, and wherein said controller controls said cooling members so that sums of predetermined combinations of said weights assigned to said cooling members are equal to or greater than said weights which correspond to said required cooling conditions.

6. A cooling control system comprising:
   a plurality of cooling members;
   a monitor which monitors states of predetermined combinations of said cooling members; and
   a controller which controls said cooling members based on said states monitored by said monitor.

7. A cooling control system comprising:
   a plurality of cooling members;
   a weight assignment part which assigns a weight to each of said cooling members; and
   a controller which controls said cooling members in accordance with said weights assigned to said cooling members.

8. The cooling control system as claimed in claim 7, wherein said weight is determined in accordance with a cooling capability of each of said cooling members.

9. The cooling control system as claimed in claim 7, wherein said weight is determined in accordance with an importance of each of said cooling members.

10. The cooling control system as claimed in claim 7, wherein said controller recognizes weights which correspond to required cooling conditions, and wherein said controller controls said cooling members so that sums of predetermined combinations of said weights assigned to said cooling members are equal to or greater than said weights which correspond to said required cooling condition of the system.

11. A method of cooling a device, comprising:
    monitoring states of predetermined combinations of cooling elements;
    determining whether the device can be cooled below a predetermined temperature based on the monitored states; and
    controlling the cooling elements to facilitate lowering an ambient temperature within the device below the predetermined temperature based on the monitored states and the determination of whether the device can be cooled below the predetermined temperature.

12. A method of cooling a device as claimed in claim 11, wherein said monitoring step further includes evaluating the cooling capacity of each cooling element by way of a signal from each cooling element, and thereafter assigning a weight to each cooling element based on the evaluated cooling capacity of each cooling element.

13. A device cooling control apparatus, comprising: a plurality of cooling elements;
    a monitor to monitor states of predetermined combinations of said cooling elements; and
    a controller to control said cooling elements based on an ambient temperature within the device, a determination whether the device can be cooled below a predetermined temperature, and the monitored states of said cooling elements.

* * * * *